United States Patent
Kanou et al.

(10) Patent No.: US 10,418,823 B2
(45) Date of Patent: Sep. 17, 2019

(54) POWER TRANSMISSION SYSTEM INCLUDING POWER TRANSMITTER AND POWER RECEIVER

(71) Applicant: Panasonic Intellectual Property Management Co., Ltd., Osaka (JP)

(72) Inventors: Junichi Kanou, Osaka (JP); Masahiro Yamaoka, Osaka (JP); Akira Minegishi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 232 days.

(21) Appl. No.: 15/594,052

(22) Filed: May 12, 2017

(65) Prior Publication Data

US 2017/0346300 A1 Nov. 30, 2017

(30) Foreign Application Priority Data

May 27, 2016 (JP) .................................. 2016-106661

(51) Int. Cl.

| G05F 1/585 | (2006.01) |
| H02J 4/00 | (2006.01) |
| H02J 50/10 | (2016.01) |
| H02J 50/40 | (2016.01) |

(52) U.S. Cl.
CPC ................ H02J 4/00 (2013.01); H02J 50/10 (2016.02); H02J 50/40 (2016.02)

(58) Field of Classification Search
CPC .............. H02J 50/10; H02J 4/00; H02J 50/40
See application file for complete search history.

(56) References Cited

U.S. PATENT DOCUMENTS

| 2003/0078797 A1 | 4/2003 | Kanbara et al. |
| 2008/0026704 A1* | 1/2008 | Maeda ................... H04L 5/023 455/91 |
| 2011/0254377 A1 | 10/2011 | Wildmer et al. |

(Continued)

FOREIGN PATENT DOCUMENTS

| EP | 2793352 | 10/2014 |
| JP | 2010-088276 | 4/2010 |

(Continued)

*Primary Examiner* — Alfonso Perez Borroto
*Assistant Examiner* — Esayas G Yeshaw
(74) *Attorney, Agent, or Firm* — McDermott Will & Emery LLP

(57) ABSTRACT

A power transmission system includes: a power transmitter connected to a power supply; a plurality of power receivers respectively connected to a plurality of loads; a power transmission line connecting the power transmitter and the plurality of power receivers; and a controller. The controller acquires information on optimum power for maximizing transmission efficiency in the power transmission line and information on power demands requested by the loads, and routes transmission power from the power transmitter selectively to the plurality of power receivers. The transmission power is equal to or smaller than the optimum power. When a total power demand is larger than the optimum power, the controller requests another controller to supply supplementary power. When the total power demand is smaller than the optimum power, the controller notifies the other controller that surplus power is available.

9 Claims, 21 Drawing Sheets

(56) References Cited

U.S. PATENT DOCUMENTS

| | | | |
|---|---|---|---|
| 2012/0221165 A1* | 8/2012 | Ooba | H02J 3/381 700/297 |
| 2015/0333544 A1* | 11/2015 | Toya | H01M 10/48 320/112 |
| 2016/0006591 A1* | 1/2016 | Huomo | H04B 3/542 375/295 |
| 2018/0052505 A1* | 2/2018 | Cruickshank, III | H02J 3/00 |

FOREIGN PATENT DOCUMENTS

| | | |
|---|---|---|
| JP | 2011-166850 | 8/2011 |
| JP | 2013-146171 | 7/2013 |
| JP | 2013-528043 | 7/2013 |
| JP | 2016-042787 | 3/2016 |
| WO | 2002/029952 | 4/2002 |
| WO | 2011/159589 | 12/2011 |

* cited by examiner

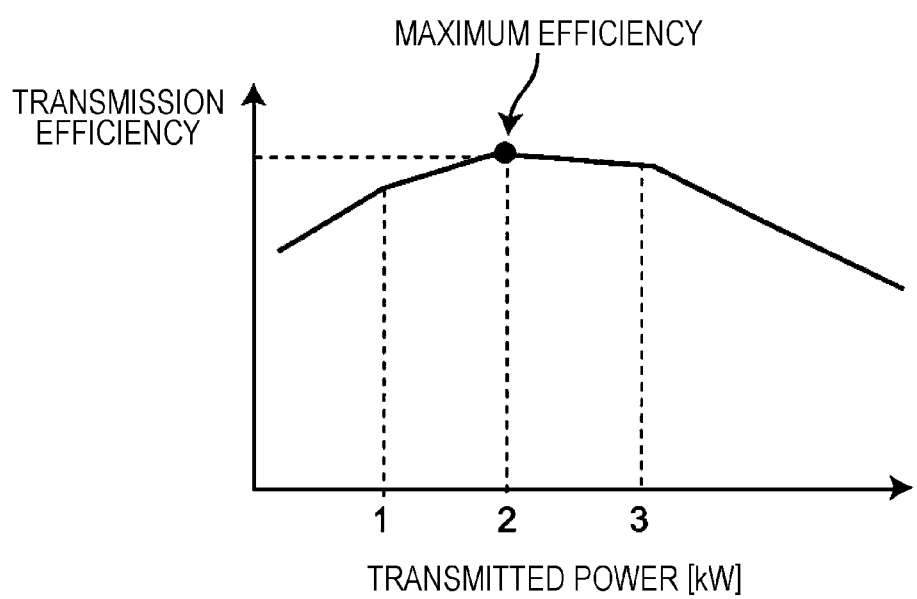

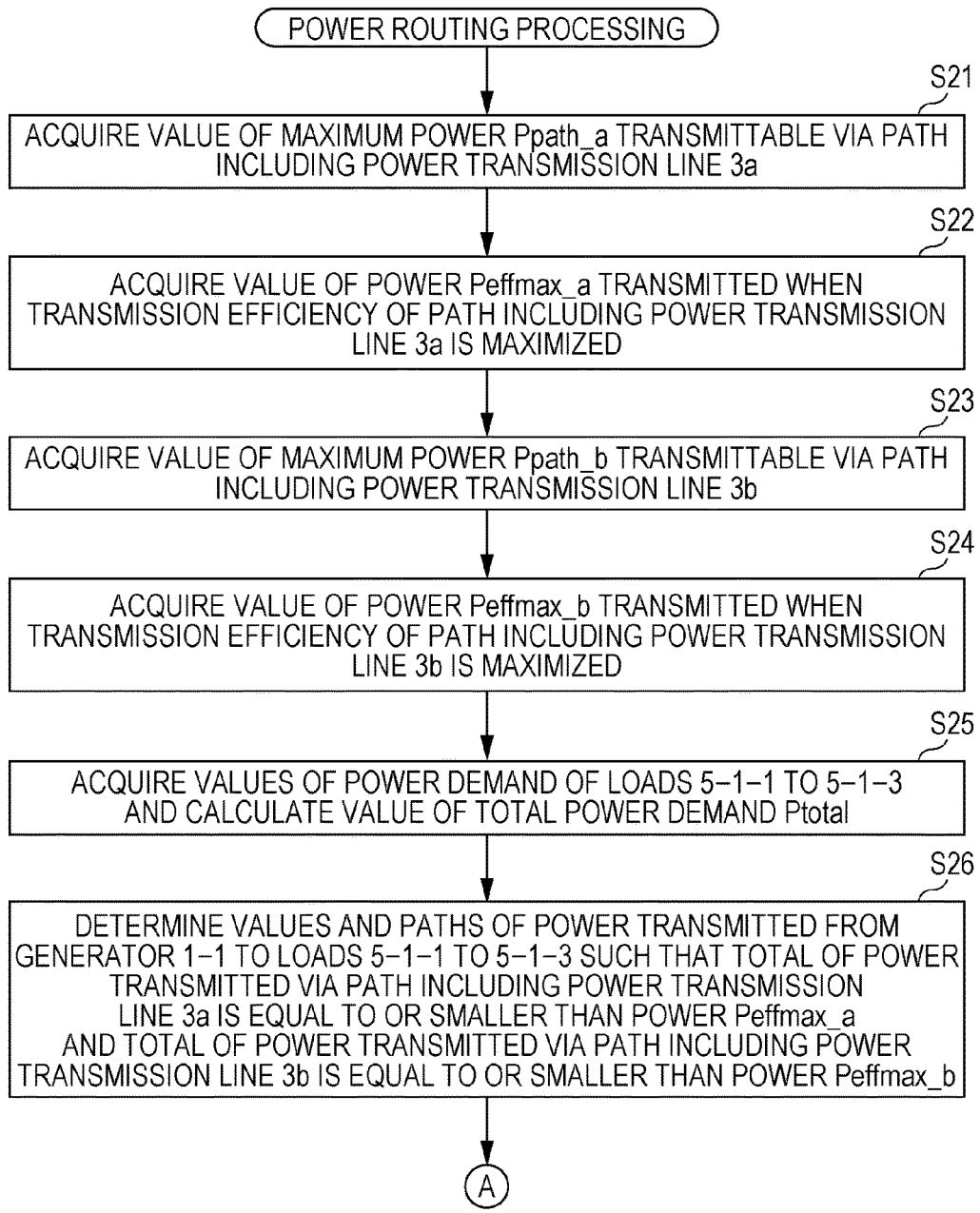

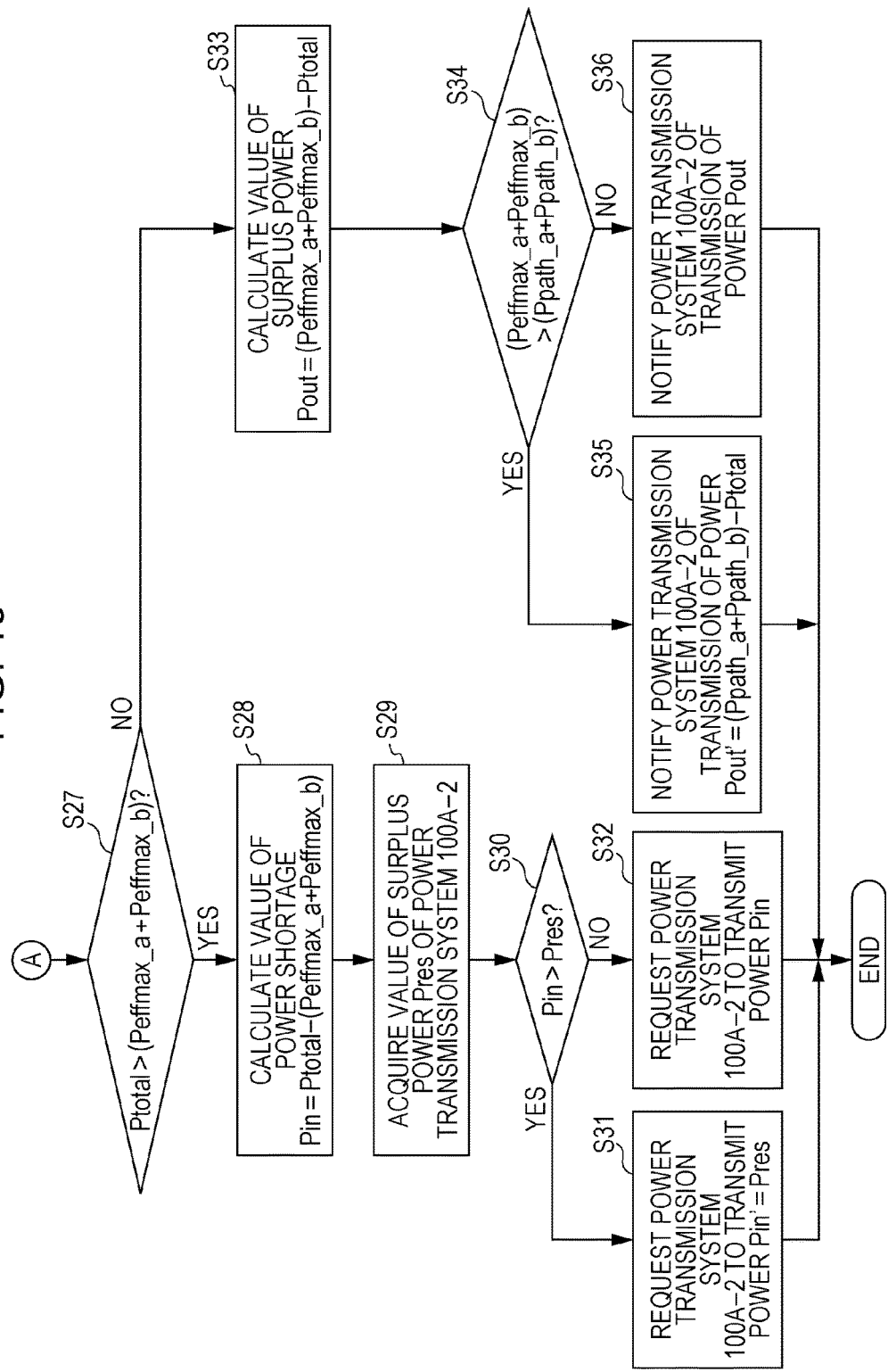

POWER TRANSMISSION SYSTEM INCLUDING POWER TRANSMITTER AND POWER RECEIVER

BACKGROUND

1. Technical Field

The present disclosure relates to a power transmission system including a power transmitter and a power receiver that transmit and receive electric power via a wired or wireless power transmission line.

2. Description of the Related Art

In recent years, power supply by power generation that utilizes natural energy such as solar power generation, wind power generation, and geothermal power generation has been rapidly increasing in addition to commercial power supply provided by electric power companies such as thermal power generation, water power generation, and nuclear power generation. Separately from a currently-laid large-scale commercial power network, smart grids have been introduced and moreover local small-scale power networks for realizing local generation and local consumption of power have been spreading worldwide for the purpose of reducing a power loss due to long-distance power transmission.

For example, Japanese Unexamined Patent Application Publication (Translation of PCT Application) No. 2013-529057 discloses a power generation plant in which the efficiency of an AC generator connected to a DC bus is improved by applying a substantially constant load to the generator.

SUMMARY

In one general aspect, the techniques disclosed here feature a power transmission system including: one or more power transmitters, each of which includes a modulator and is connected to a power supply; a plurality of power receivers, each of which includes a demodulator and is connected to a corresponding one of a plurality of loads; one or more power transmission lines, through which the one or more power transmitters are connected with the plurality of power receivers; and a controller. The controller (A) acquires information on optimum power for maximizing transmission efficiency in the one or more power transmission lines, and information on a plurality of power demands respectively requested by the plurality of loads, (B) routes, based on the information on the optimum power, transmission power from the one or more power transmitters to at least one selected from the plurality of power receivers, the transmission power being equal to or smaller than the optimum power, (C) when a total of the plurality of power demands is larger than the optimum power, requests that another controller controls supplementary power to be supplied from another power supply to the one or more power transmission lines, and (D) when the total of the plurality of power demands is smaller than the optimum power, notifies the other controller that surplus power of the one or more power transmitters is available.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 10 is a diagram illustrating an example of a relation between transmitted power and transmission efficiency in the power transmission system according to the first embodiment;

FIG. 18 is a flowchart illustrating a first portion of power routing processing in the power transmission system according to the second embodiment; and FIG. 19 is a flowchart illustrating a second portion of the power routing processing in the power transmission system according to the second embodiment.

DETAILED DESCRIPTION

Figure 1:
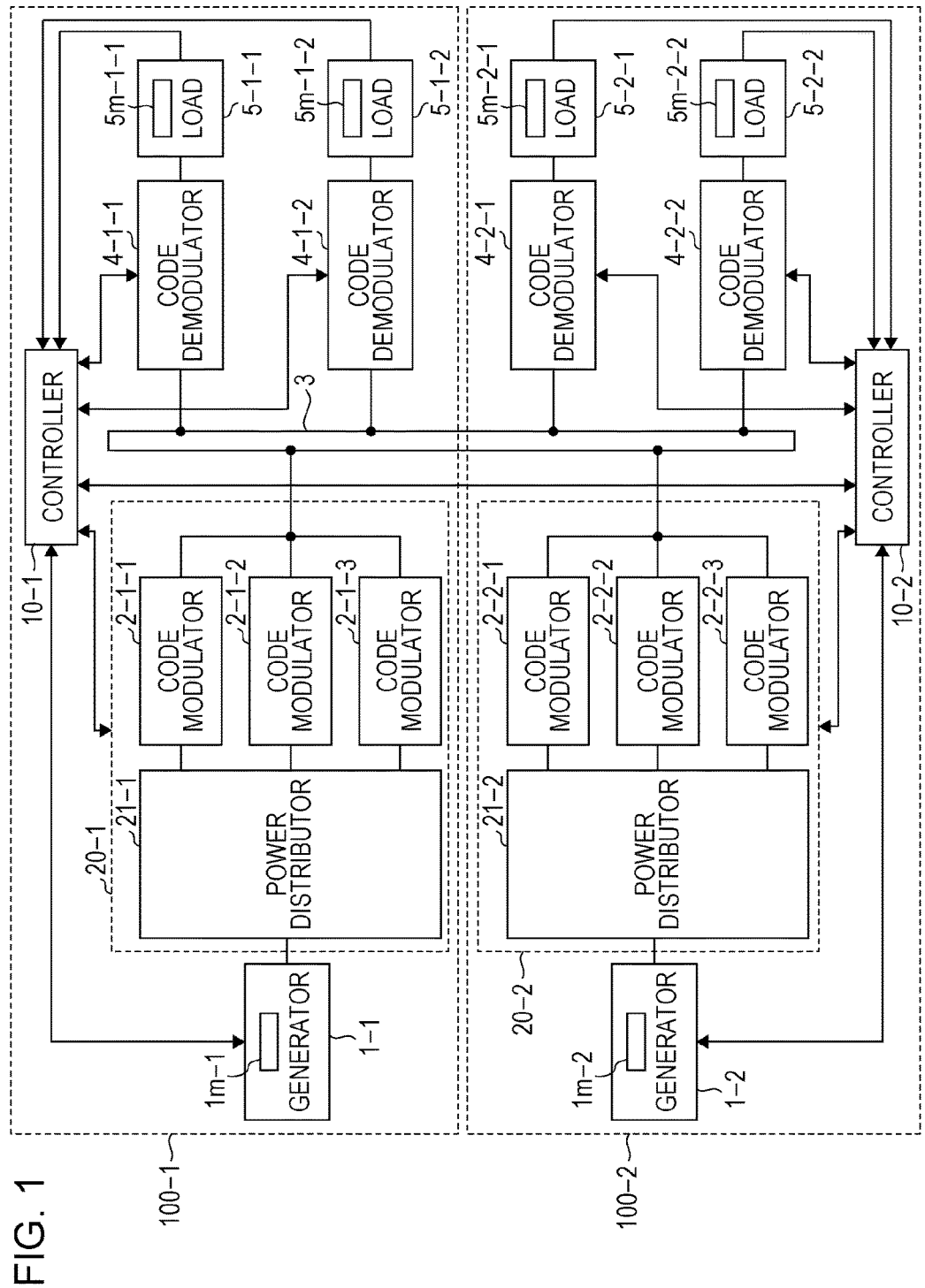
FIG. 1 is a block diagram illustrating a configuration example of a power transmission system according to a first embodiment.

<Underlying Knowledge Forming Basis of the Present Disclosure>

The small-scale power network enables self-power supply by using a generator that uses the natural energy, and performing high-efficiency power collection in electric facilities functioning as loads. This power network is highly expected as a power transmission system for solving a problem of unelectrified regions such as an oasis in a desert and an isolated island.

Direct-current power is generated by power generation from solar light that occupies most of the natural energy. On the other hand, alternating-current power is generated in wind power and geothermal power generation. A power transmission mechanism is necessary to use these kinds of powers as power for the electric facilities functioning as the loads. Currently, the generators and the loads are connected by wired transmission lines (conductors), a power network in which multiple wired transmission lines are connected to one another is formed, and power is transmitted in the power network. In order to simultaneously transmit both the direct-current power and the alternating-current power in one power network, the power network has to be equipped with different power distribution facilities that transmit the two kinds of powers, and may become extremely complicated. To avoid this, transmission of the powers requires the powers to be transformed to any one of a direct current and an alternating current.

When there are multiple loads, the loads demand respectively different amounts of power. To satisfy their demands, there is a need for power transmission control for distributing a necessary amount of power to each of the loads.

In general, an amount of power required by a certain load is different from an amount of power generated by a certain generator (or another power supply) operating at highest efficiency. Therefore, when an amount of power transmitted from a specific power transmission facility is changed according to the amount of power required by the load, power transmission efficiency sometimes drops. Therefore, it is necessary to adjust an amount of power transmitted from the power transmission facility in order to perform highly efficient power transmission.

Japanese Unexamined Patent Application Publication (Translation of PCT Application) No. 2013-529057 discloses that a generator and a charging/discharging device are used together, fluctuation in power demand of a load is suppressed by the charging/discharging device, and the generator is operated at efficiency closer to a high efficiency point. Specifically, when output power at the high efficiency point of the generator is smaller than the power demand of the load, power compensating for power shortage is supplied from a capacitor or the like to the load. When the output power at the high efficiency point of the generator is larger than the power demand of the load, surplus power is consumed by a register or the like. Consequently, even if the power demand of the load fluctuates, output fluctuation of the generator is suppressed. However, in such a case, additional charging/discharging devices such as a capacitor, a battery, and a register are necessary, so that the cost of the entire system increases. In addition, efficiency of power transmission drops in the case of using the register, which just wastefully consumes energy.

Since the conventional power generation plant uses the charging/discharging devices in that way, the cost of the entire system increases and the efficiency of the power transmission drops. Therefore, there is a demand for a power transmission system that is capable of transmitting power from a power supply to a load at maximum or nearly maximum transmission efficiency of the power transmission system without using additional charging/discharging devices.

The present disclosure provides a power transmission system that can transmit power from a power supply to a load at maximum or nearly maximum transmission efficiency of the power transmission system without using additional charging/discharging devices.

Based on the above studies, the present inventors have conceived the following aspects of the invention.

Embodiments according to the present disclosure are explained below with reference to the accompanying drawings. Note that, in the embodiments, the same components are denoted by the same reference numerals.

First Embodiment

FIG. 1 is a block diagram illustrating the configuration of power transmission systems 100-1 and 100-2 according to a first embodiment.

The power transmission system 100-1 illustrated in FIG. 1 includes a generator 1-1, a power transmitter 20-1, a power transmission line 3, code demodulators 4-1-1 and 4-1-2, loads 5-1-1 and 5-1-2, and a controller 10-1. The power transmission system 100-1 transmits power from the generator 1-1, which is at least one power supply, to the multiple loads 5-1-1 and 5-1-2.

The generator 1-1 generates, under control by the controller 10-1, power for maximizing the transmission efficiency of the power transmission system 100-1 or power having magnitude corresponding to a power value requested by the loads 5-1-1 and 5-1-2. The power generated by the generator 1-1 may be a direct current or may be an alternating current.

The power transmitter 20-1 includes a power distributor 21-1 and code modulators 2-1-1, 2-1-2, and 2-1-3. The power distributor 21-1 distributes the power inputted from the generator 1-1 according to the number of the code modulators 2-1-1, 2-1-2, and 2-1-3 and at a ratio instructed by the controller 10-1. Each of the code modulators 2-1-1, 2-1-2, and 2-1-3 modulates the distributed power in a predetermined modulation scheme and outputs the modulated power to the power transmission line 3 under the control by the controller 10-1.

The power transmission line 3 may be a wired transmission line or may be a wireless transmission line. In this embodiment, as an example, the power transmission line 3 is the wired transmission line.

The code demodulators 4-1-1 and 4-1-2 demodulate the power inputted from the power transmission line 3 in a demodulation scheme corresponding to the modulation scheme and respectively output the demodulated power to the loads 5-1-1 and 5-1-2 under the control by the controller 10-1.

The modulation scheme and the demodulation scheme are respectively, for example, a code modulation scheme and a code demodulation scheme by a predetermined code sequence as explained below.

The loads 5-1-1 and 5-1-2 are electric equipment such as motors. The loads 5-1-1 and 5-1-2 send a power demand value to the controller 10-1.

The generator 1-1 includes a power meter 1$m$-1. The power meter 1$m$-1 measures a power amount of power inputted from the generator 1-1 to the power transmitter 20-1, that is, a power generation amount of the generator 1-1 and sends the power amount to the controller 10-1. The load 5-1-1 includes a power meter 5$m$-1-1. The load 5-1-2 includes a power meter 5$m$-1-2. The power meter 5$m$-1-1 measures a power amount of power inputted from the code demodulator 4-1-1 to the load 5-1-1, that is, consumed power in the load 5-1-1 and sends the power amount to the controller 10-1. The power meter 5$m$-1-2 measures a power amount of power inputted from the code demodulator 4-1-2 to the load 5-1-2, that is, consumed power in the load 5-1-2 and sends the power amount to the controller 10-1.

The controller 10-1 controls the operations of the power transmitter 20-1 and the code demodulators 4-1-1 and 4-1-2 based on the received respective power amounts.

The power meter 1$m$-1 may be provided in a pre-stage of the power transmitter 20-1 instead of the generator 1-1. The power meters 5$m$-1-1 and 5$m$-1-2 may be provided in post-stages of the code demodulators 4-1-1 and 4-1-2 instead of the loads 5-1-1 and 5-1-2.

Note that the generator 1-1 and/or the loads 5-1-1 and 5-1-2 may be power storage devices such as batteries or capacitors. By incorporating the power storage devices in the power transmission system 100-1, it is possible to efficiently utilize power generated in a period of time when power consumption is small or there is no power consumption. It is possible to improve power efficiency in the entire system.

For example, the power transmission system 100-2 illustrated in FIG. 1 may be configured the same as the power transmission system 100-1. In this case, the power transmission system 100-2 includes a generator 1-2, a power transmitter 20-2, the power transmission line 3, code demodulators 4-2-1 and 4-2-2, loads 5-2-1 and 5-2-2, and a controller 10-2. The power transmitter 20-2 includes a power distributor 21-2 and code modulators 2-2-1, 2-2-2, and 2-2-3. The generator 1-1 includes a power meter 1$m$-1. The load 5-2-1 includes a power meter 5$m$-2-1. The load 5-2-2 includes a power meter 5$m$-2-2.

The power transmission system 100-1 is connected to the power transmission system 100-2 on the outside via the power transmission line 3. Specifically, the power transmitter 20-1 and the code demodulators 4-1-1 and 4-1-2 of the power transmission system 100-1 are connected to the power transmitter 20-2 and the code demodulators 4-2-1 and 4-2-2 of the power transmission system 100-2 via the power transmission line 3. Consequently, when power runs short in the power transmission system 100-1, the controller 10-1 of the power transmission system 100-1 acquires the power compensating for power shortage from the power transmission system 100-2. Similarly, when surplus power is generated in the power transmission system 100-1, the controller 10-1 of the power transmission system 100-1 transmits the surplus power to the power transmission system 100-2. Therefore, the controller 10-1 of the power transmission system 100-1 communicates with the controller 10-2 of the power transmission system 100-2.

An operation principle of code modulation and code demodulation in the power transmission systems 100-1 and 100-2 illustrated in FIG. 1 is explained.

Figure 2:
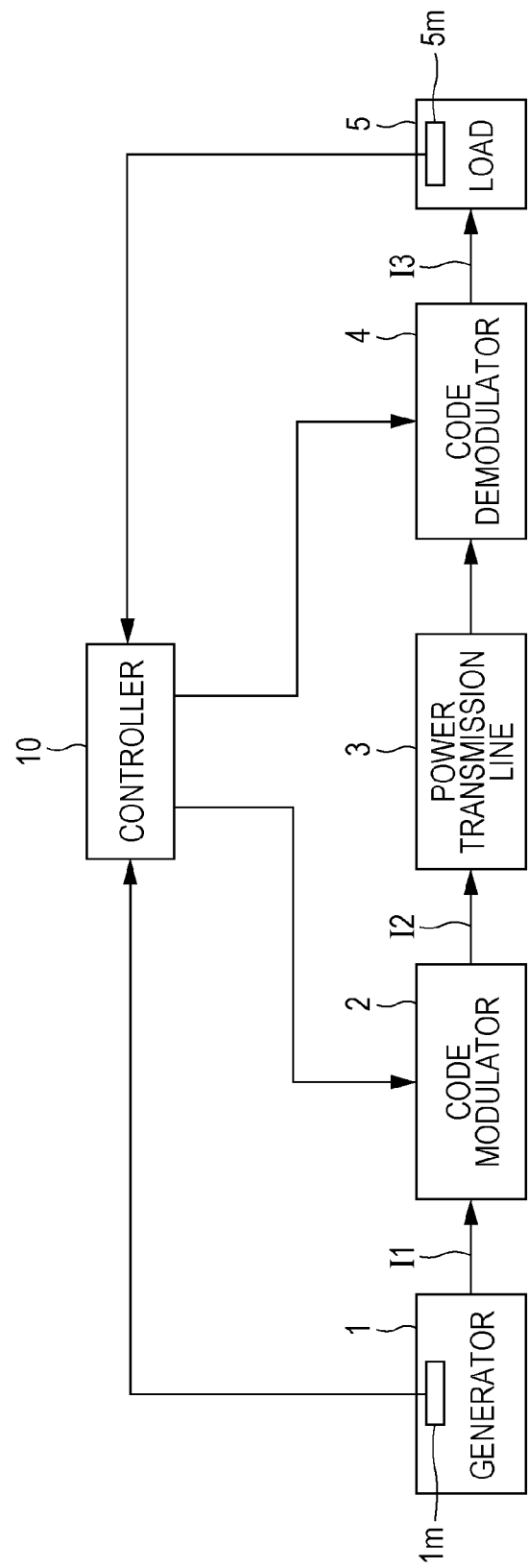
FIG. 2 is a block diagram illustrating the configuration of an illustrative power transmission system.

FIG. 2 is a block diagram illustrating the configuration of an illustrative power transmission system for explaining the operation principle of the power transmission systems 100-1 and 100-2 illustrated in FIG. 1. The power transmission system illustrated in FIG. 2 includes a generator 1, a code modulator 2, the power transmission line 3, a code demodulator 4, a load 5, and a controller 10.

In the power transmission system illustrated in FIG. 2, direct-current power (e.g., a generated current I1) generated by the generator 1 is code-modulated by the code modulator 2 using a code sequence of an alternating-current modulation code. A code-modulated wave (e.g., a modulated current I2) code-modulated is transmitted to the power transmission line 3. The code-modulated wave code-modulated, which is transmitted via the power transmission line 3, is code-demodulated into direct-current power (e.g., a demodulated current I3) by the code demodulator 4 using a code sequence of an alternating-current demodulation code and supplied to the load 5. Note that, in the first embodiment and the like, the generated current I1 and the demodulated current I3 are used for the explanation. However, the present disclosure is not limited to this. A generated voltage and a demodulated voltage may be used.

The controller 10 transmits, to the code modulator 2 and the code demodulator 4, a system synchronization signal and a control signal including a code sequence of a modulation code or a demodulation code and a start time and an end time of power transmission (i.e., modulation and demodulation). The system synchronization signal is used to temporally synchronize the code modulator 2 and the code demodulator 4 with each other.

The code sequence of the modulation code and the code sequence of the demodulation code may be respectively transmitted from the controller 10 to the code modulator 2 and the code demodulator 4. Rather than transmitting the code sequence itself, the controller 10 may transmit original data for generating the code sequence to the code modulator 2 and the code demodulator 4. The code modulator 2 and the code demodulator 4 may respectively generate the code sequence of the modulation code and the code sequence of the demodulation code based on the original data. The code sequence of the modulation code and the code sequence of the demodulation code may be respectively set in the code modulator 2 and the code demodulator 4 in advance.

When the power transmission system includes multiple generators 1, multiple code modulators 2, multiple loads 5, and multiple code demodulators 4, a combination of the code modulator 2 and the code demodulator 4 that perform power transmission can be designated according to the code sequence (or the original data of the code sequence) transmitted from the controller 10 to the code modulator 2 and the code demodulator 4. The controller 10 transmits the code sequence of the modulation code to the code modulator 2, to which should transmit power, and, on the other hand, transmits the code sequence of the demodulation code to the code demodulator 4, which should receive the power, to enable transmission of power from the generator 1, which is connected to the designated code modulator 2, to the load 5, which is connected to the designated code demodulator 4.

The generator 1 includes a power measurer 1$m$. The power measurer 1$m$ measures a power amount of direct-current power from the generator 1 to the code modulator 2, which is a power generation amount of the generator 1, and sends the power amount to the controller 10. The load 5 includes a power measurer 5m. The power measurer 5m measures a power amount of direct-current power from the code demodulator 4 to the load 5, which is a power use amount in the load 5, and sends the power amount to the controller 10. The controller 10 controls the operations of the code modulator 2 and the code demodulator 4 based on the received power amounts.

Figure 3:
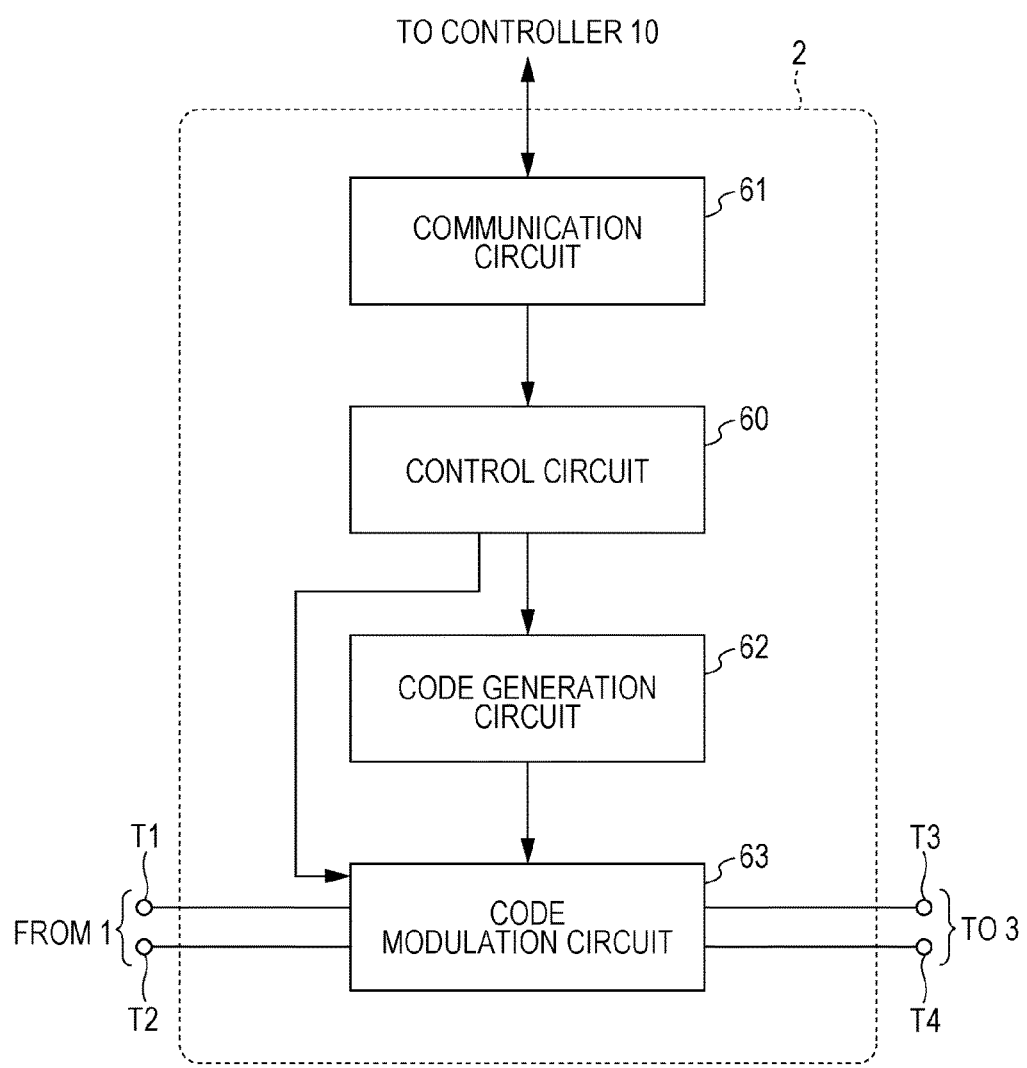
FIG. 3 is a block diagram illustrating a configuration example of a code modulator according to the first embodiment.

FIG. 3 is a block diagram illustrating the configuration of the code modulator 2 illustrated in FIG. 2. The code modulator 2 illustrated in FIG. 3 includes a control circuit 60, a communication circuit 61, a code generation circuit 62, and a code modulation circuit 63. The code modulator 2 illustrated in FIG. 3 includes input terminals T1 and T2 connected to the generator 1 and output terminals T3 and T4 connected to the power transmission line 3.

The communication circuit 61 receives a system synchronization signal and a control signal including a code sequence (or original data of the code sequence) of a modulation code and a start time and an end time of power transmission from the controller 10 and sends the system synchronization signal and the control signal to the control circuit 60. Based on the control signal received from the controller 10, the control circuit 60 causes the code generation circuit 62 to generate a code sequence of a modulation code and output the code sequence to the code modulation circuit 63 and controls an operation start and an operation end of the code modulation circuit 63. The code modulation circuit 63 modulates power inputted from the generator 1 via the input terminals T1 and T2 and outputs the modulated power to the power transmission line 3 via the output terminals T3 and T4.

Figure 4:
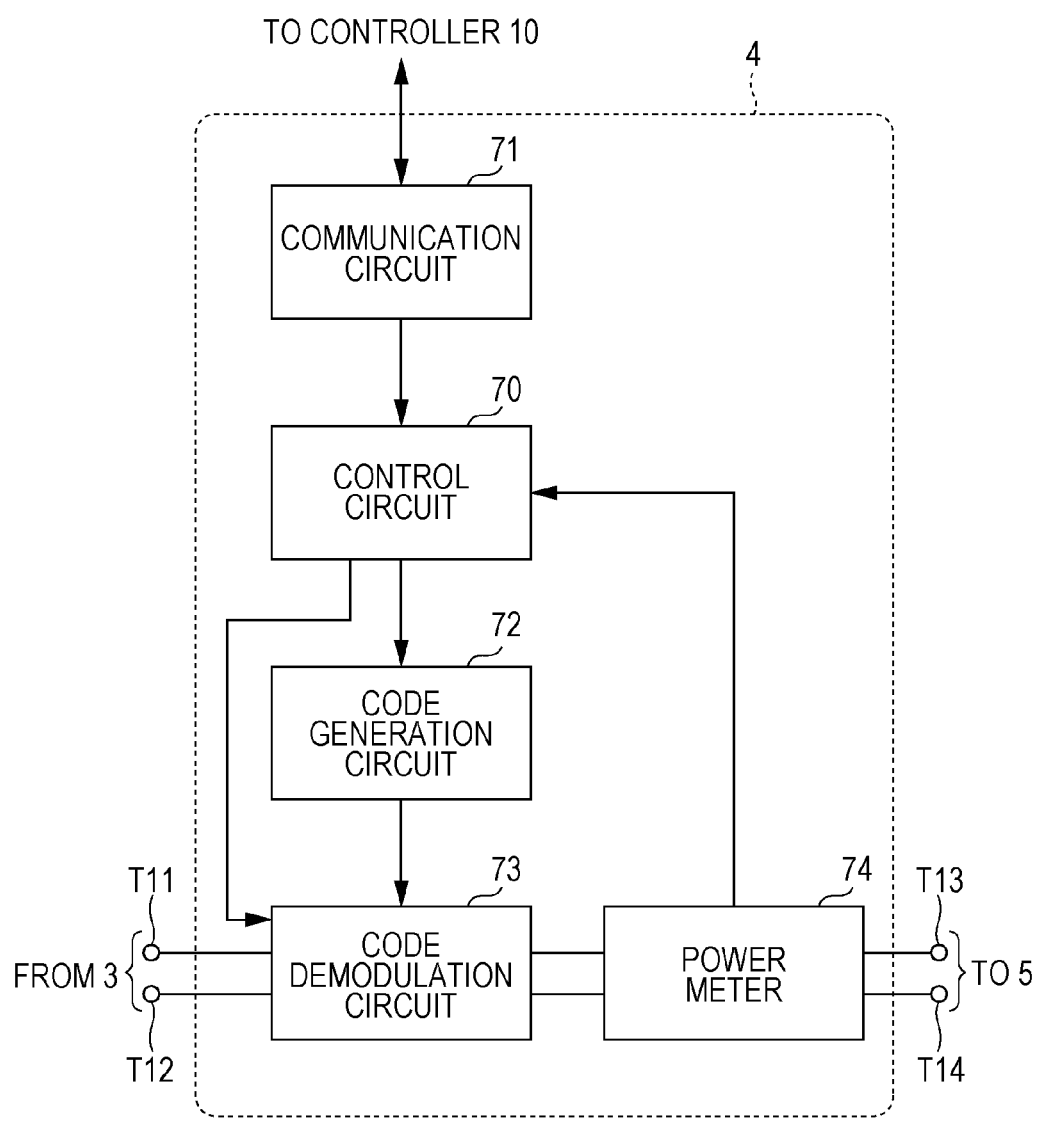
FIG. 4 is a block diagram illustrating a configuration example of a code demodulator according to the first embodiment.

FIG. 4 is a block diagram illustrating the configuration of the code demodulator 4 illustrated in FIG. 2. The code demodulator 4 illustrated in FIG. 4 includes a control circuit 70, a communication circuit 71, a code generation circuit 72, a code demodulation circuit 73, and a power meter 74. The code demodulator 4 illustrated in FIG. 4 includes input terminals T11 and T12 connected to the power transmission line 3 and output terminals T13 and T14 connected to the load 5.

The communication circuit 71 receives a system synchronization signal and a control signal including a code sequence (or original data of the code sequence) of a demodulation code and a start time and an end time of power transmission and sends the system synchronization signal and the control signal to the control circuit 70. Based on the control signal received from the controller 10, the control circuit 70 causes the code generation circuit 72 to generate a code sequence of a demodulation code and output the code sequence to the code demodulation circuit 73 and controls an operation start and an operation end of the code demodulation circuit 73. The code demodulation circuit 73 demodulates power inputted from the power transmission line 3 via the input terminals T11 and T12 and outputs the demodulated power to the load 5 via the output terminals T13 and T14. The power meter 74 measures a power amount of modulated power and notifies the controller 10 of the power amount, via the control circuit 70 and the communication circuit 71.

Note that, in the power transmission system illustrated in FIG. 2, the control signals from the controller 10 to the code modulator 2 and the code demodulator 4 may be transmitted by wireless or by a control signal line different from the power transmission line 3 or may be multiplexed with a code-modulated wave according to a predetermined multiplexing scheme and transmitted by using the power transmission line 3. In the latter case, the communication circuits 61 and 31 used for the communication from the controller 10 to the code modulator 2 and the code demodulator 4 can be removed to reduce cost.

A method of modulating and demodulating power using code modulation is explained.

Figure 5:
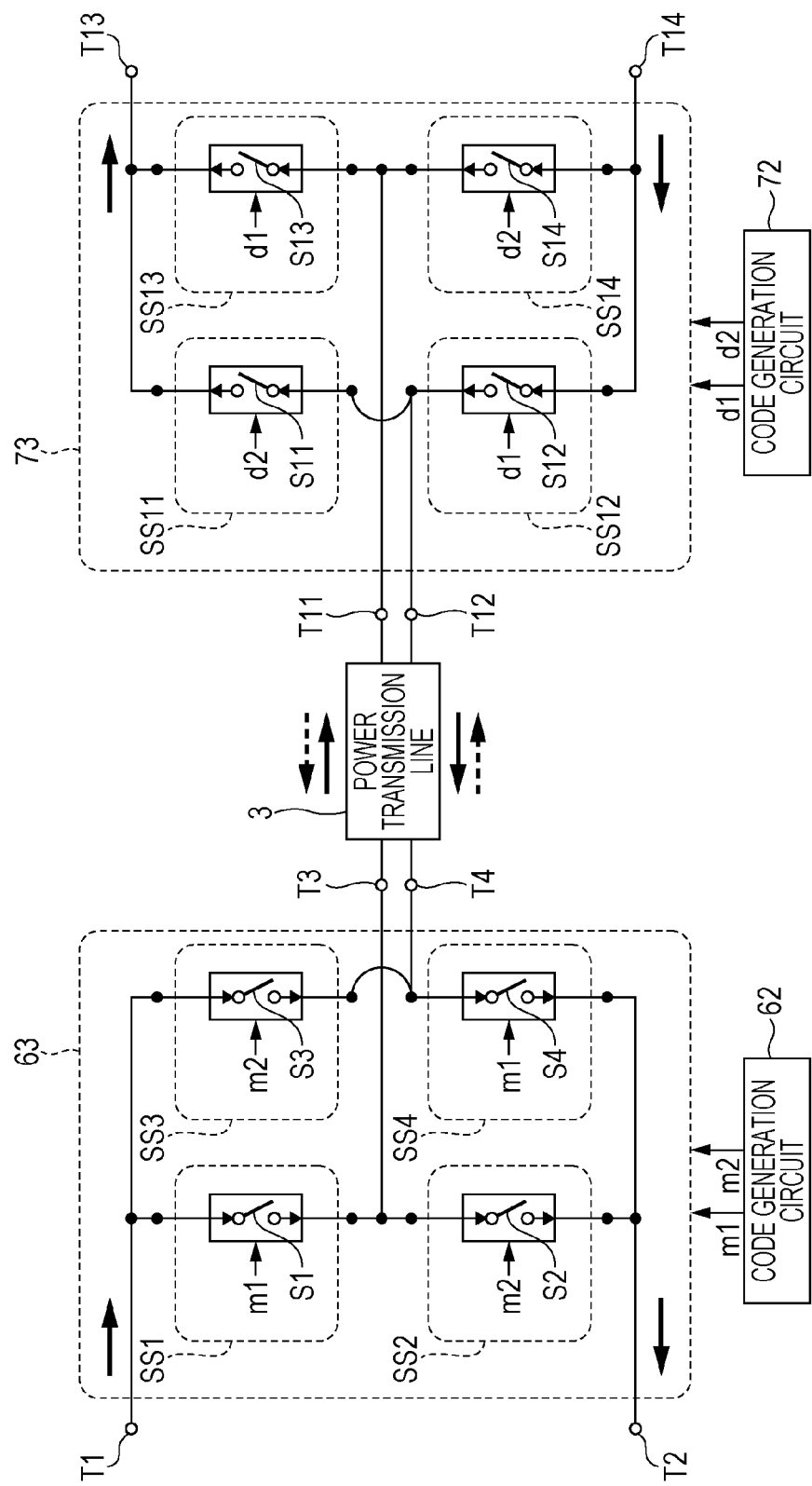
FIG. 5 is a circuit diagram illustrating a configuration example of a code modulation circuit and a code demodulation circuit according to the first embodiment.

FIG. 5 is a circuit diagram illustrating the configuration of a code modulation circuit 63 illustrated in FIG. 3 and the code demodulation circuit 73 illustrated in FIG. 4. In FIG. 5, for simplification of illustration, the power meter 74 illustrated in FIG. 4 is omitted. In FIG. 5, the code modulation circuit 63 includes four switch circuits SS1 to SS4 connected in a bridge form. The switch circuits SS1 to SS4 respectively include directional switch elements S1 to S4 configured by, for example, MOS transistors. The code demodulation circuit 73 includes four switch circuits SS11 to SS14 connected in a bridge form. The switch circuits SS11 to SS14 respectively include directional switch elements S11 to S14 configured by, for example, MOS transistors.

The code generation circuit 62 generates predetermined code sequences m1 and m2, applies the code sequence m1 to the switch elements S1 and S4 as a control signal, and applies the code sequence m2 to the switch elements S2 and S3 as a control signal. For example, the switch elements S1 to S4 are turned on when a control signal "1" is applied to the switch elements S1 to S4. The switch elements S1 to S4 are turned off when the control signal "0" is applied to the switch elements S1 to S4. Note that switches other than the switch elements S1 to S4 operate in the same manner. The switch elements S1 to S4 have directionality as explained below. The switch element S1 outputs a generated current inputted from the terminal T1 when the switch element S1 is on to the terminal T3. The switch element S3 outputs a generated current inputted from the terminal T1 when the switch element S3 on to the terminal T4. The switch element S2 outputs a modulated current inputted from the terminal T3 when the switch element S2 is on to the terminal T2. The switch element S4 outputs a modulated current inputted from the terminal T4 when the switch element S4 is on to the terminal T2.

The code generation circuit 72 generates predetermined code sequences d1 and d2, applies the code sequence d1 to the switch elements S12 and S13 as a control signal, and applies the code sequence d2 to the switch elements S11 and S14 as a control signal. The switch elements S11 to S14 have directionality as explained below. The switch element S11 outputs a modulated current inputted from the terminal T12 when the switch element S11 is turned on to the terminal T13. The switch element S13 outputs a modulated current inputted from the terminal T11 when the switch element S13 is turned on to the terminal T13. The switch element S12 outputs a demodulated current inputted from the terminal T14 when the switch element S12 is turned on to the terminal T12. The switch element S14 outputs a demodulated current inputted from the terminal T14 when the switch element S14 is turned on to the terminal T11.

Note that, in the description in FIG. 5, a direction in which an electric current flows in the switch elements S11 to S14 of the code demodulator 4 is described as being opposite to a direction in which an electric current flows in the switch elements S1 to S4 of the code modulator 2.

Table 1 is a table illustrating an example of modulation codes of the code modulation circuit 63 and demodulation codes of the code demodulation circuit 73 according to an example 1 that transmit direct-current power and receive the direct-current power in the power transmission system illustrated in FIG. 2. That is, Table 1 illustrates an example of code sequences m1 and m2 applied to the switch elements S1 to S4 of the code modulator 2 and code sequences d1 and d2 applied to the switch elements S11 to S14 of the code demodulator 4.

TABLE 1

| Control signal | Code sequence |
|---|---|
| m1 | c1a = [1 0 1 1 1 0 0] |
| m2 | c1b = [0 1 0 0 0 1 1] |
| d1 | c1a = [1 0 1 1 1 0 0] |
| d2 | c1b = [0 1 0 0 0 1 1] |

As illustrated in Table 1, the code sequence m1 and the code sequence d1 are a code sequence c1$a$ and same as each other. The code sequence m2 and the code sequence d2 are a code sequence c1$b$ and same as each other. A relation between the code sequence c1$a$ and the code sequence c1$b$ is set to set a code of the code sequence c1$b$ to 0 when a code of the code sequence c1$a$ is 1 and set the code of the code sequence c1$b$ to 1 when the code of the code sequence c1$a$ is 0. That is, when a switch applied with the code of the code sequence c1$a$ (the code sequences m1 and d1) is turned on, a switch applied with the code of the code sequence c1$b$ (the code sequences m2 and d2) is turned off. When the switch applied with the code of the code sequence c1$a$ is applied is turned off, the switch applied with the code of the code sequence c1$b$ is turned on.

In the code modulation circuit 63 illustrated in FIG. 5, the code sequence c1$a$ is applied to the switch elements S1 and S4 and the code sequence c1$b$ is applied to the switch elements S2 and S3. Therefore, when the switch elements S1 and S4 are turned on, the switch elements S2 and S3 are turned off. When the switch elements S1 and S4 are turned off, the switch elements S2 and S3 are turned on. Consequently, when the switch elements S1 and S4 are turned on and the switch elements S2 and S3 are turned off, a positive modulated current I2 (a solid line arrow in FIG. 5) corresponding to code 1 flows to the power transmission line 3. On the other hand, when the switch elements S1 and S4 are turned off and the switch elements S2 and S3 are turned on, a negative modulated current I2 (a dotted line arrow in FIG. 5) in the opposite direction corresponding to code −1 flows to the power transmission line 3. Consequently, the modulated current I2 modulated to an alternating current of code −+1 and code −1 in response to an input of direct-current power can be transmitted to the power transmission line 3.

In the code demodulation circuit 73 illustrated in FIG. 5, the switch elements S11 to S14 are turned on and off in response to the control signals of the code sequences d1 and d2 in synchronization with the code modulation circuit 63. The switch elements S12 and S13 are turned on and off according to the code sequence d1 same as the code sequence m1. The switch elements S11 and S14 are turned on and off according to the code sequence d2 same as the code sequence m2.

Consequently, when a code of the code sequence m1 is 1 in the code modulation circuit 63, that is, when the modulated current I2 corresponding to code +1 flows to the power transmission line 3, a code of the code sequence d1 is 1 and the switch elements S13 and S12 are turned on and the switch elements S11 and S14 are turned off. Consequently, a demodulated current I3 (a solid line arrow in FIG. 5) corresponding to code +1 flows to the output terminals T13 and T14 of the code demodulation signal 73. When the code of the code sequence m1 is 0 in the code modulation circuit 63, that is, when the modulated current I2 of code −1 flows to the power transmission line 3, the code of the code sequence d1 is 0 and the switch elements S11 and S14 are turned on and the switch elements S12 and S13 are turned off. Consequently, in this case, the demodulated current I3 (the solid line arrow in FIG. 5) corresponding to code +1 also flows to the output terminals T13 and T14 of the code demodulation circuit 73.

Table 2 is a table illustrating an example of modulation codes of the code modulation circuit 63 and demodulation codes of the code demodulation circuit 73 according to an example 2 that transmit direct-current power and receive the direct-current power in the power transmission system illustrated in FIG. 2.

TABLE 2

| Control signal | Code sequence |
|---|---|
| m1 | [c1a c1b] = [1 0 1 1 1 0 0 0 1 0 0 0 1 1] |
| m2 | [c1b c1a] = [0 1 0 0 0 1 1 1 0 1 1 1 0 0] |
| d1 | [c1a c1b] = [1 0 1 1 1 0 0 0 1 0 0 0 1 1] |
| d2 | [c1b c1a] = [0 1 0 0 0 1 1 1 0 1 1 1 0 0] |

Concerning the code sequences c1$a$ and c1$b$, when the number of code 1 and the number of code 0 are the same, in averaged, the code-modulated modulated current I2 flowing to the power transmission line 3 does not have a direct-current component and has only an alternating-current component. However, the number of code 1 and the number of code 0 sometimes cannot be set the same depending on a code sequent. In this case, as illustrated in Table 2, the code sequence m1 and the code sequence d1 are set to a code sequence [c1$a$ c1$b$] obtained by coupling the code sequence c1$a$ and the code sequence c1$b$ in a cascade and the code sequence m2 and the code sequence d2 are set to a code sequence [c1$b$ c1$a$] obtained by coupling the code sequence c1$b$ and the code sequence c1$a$ in a cascade. Then, an average of the code-modulated modulated current I2 flowing to the power transmission line 3 changes to 0. Only an alternating-current component can be transmitted. Consequently, an average of modulation waves of the modulated current I2 changes to 0. Transmission only with the alternating current without a direct-current component is performed. It is possible to perform power transmission with high transmission efficiency.

Figure 6A:
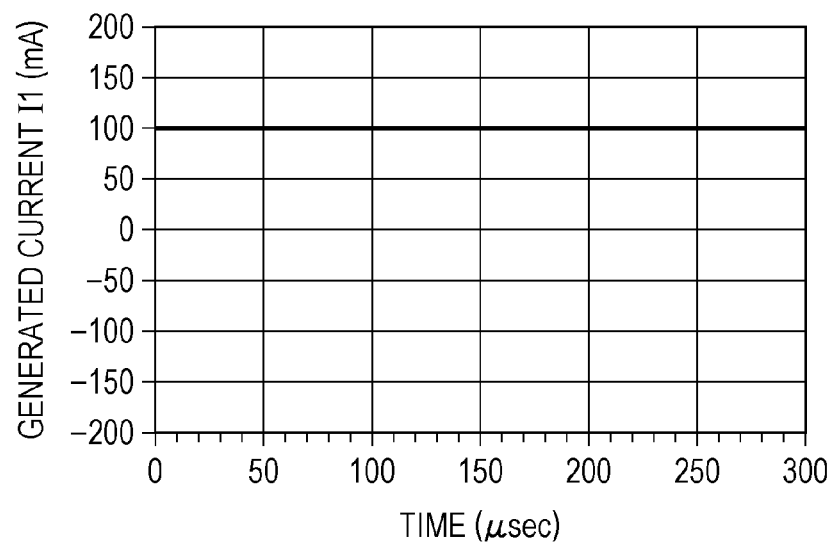
FIG. 6A is a waveform chart illustrating a waveform example of a generated current according to the first embodiment.
Figure 6B:
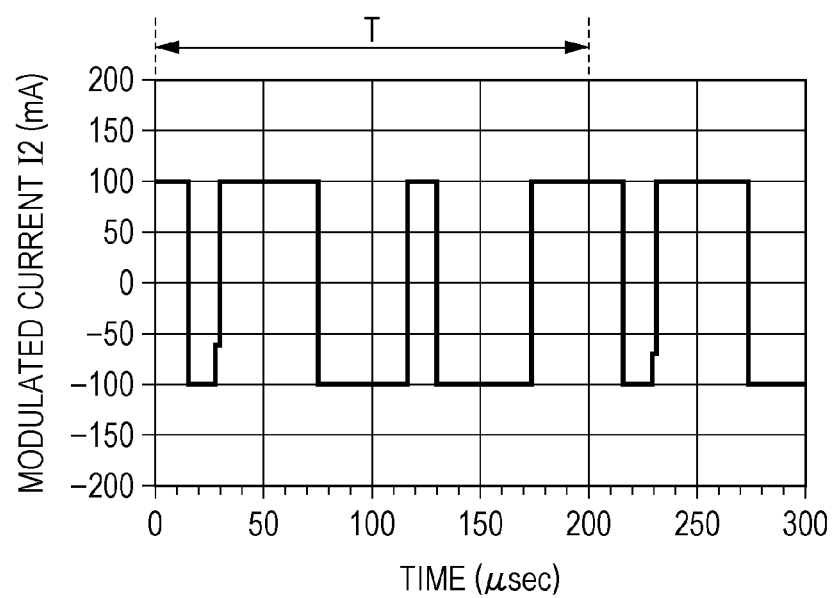
FIG. 6B is a waveform chart illustrating a waveform example of a modulated current according to the first embodiment.
Figure 6C:
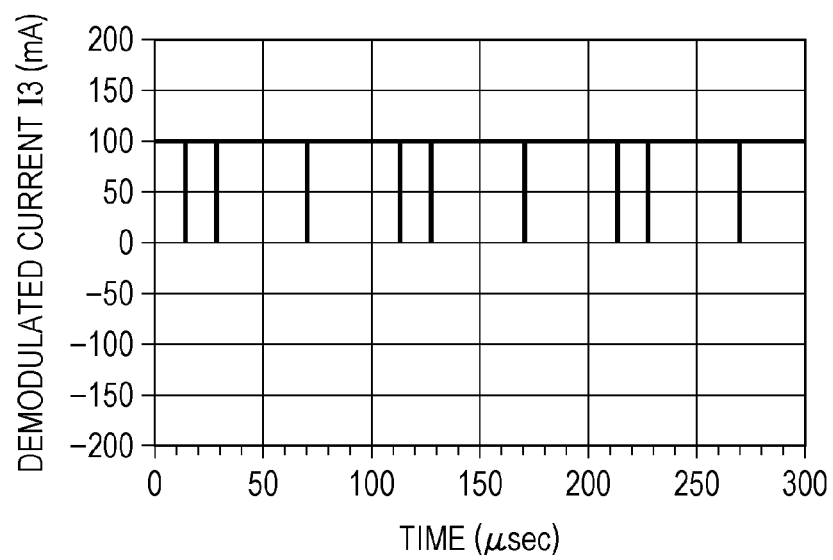
FIG. 6C is a waveform chart illustrating a waveform example of a demodulated current according to the first embodiment.

FIG. 6A is a waveform chart illustrating a signal waveform example of the generated current I1 of the power transmission system illustrated in FIG. 2. FIG. 6B is a waveform chart illustrating a signal waveform example of the modulated current I2 of the power transmission system illustrated in FIG. 2. FIG. 6C is a waveform chart illustrating a signal waveform example of the demodulated current I3 of the power transmission system illustrated in FIG. 2. Note that, in FIG. 6B, T indicates a period for one cycle of the code sequence m1 of the modulated code.

The same applies in the drawings referred to below. The code demodulator 4 illustrated in FIG. 2 can, by multiplying the modulation code m1 used for the code modulation with the same demodulation code d1, restore direct-current power generated by the generator 1. As an example, the code sequence m1 of the modulation code and the code sequence d1 of the demodulation code are respectively represented by the following expressions.

$$m1=[1\ -1\ 1\ 1\ 1\ -1\ -1\ -1\ 1\ -1\ -1\ -1\ 1\ 1] \quad (1)$$

$$d1=m1=[1\ -1\ 1\ 1\ 1\ -1\ -1\ -1\ 1\ -1\ -1\ -1\ 1\ 1] \quad (2)$$

In the signal waveform examples in FIGS. 6A to 6C, the generated direct current I1 (FIG. 6A) is multiplied with the code sequence m1 of the modulation code having a frequency of 70 kHz and including code 1 and code −1 to generate the modulated current I2 (FIG. 6B) of the code-modulated wave. In this case, time width of one code is 1/(70 kHz)=14.2 microseconds. Subsequently, the modulated current I2 (the code sequence m1) of the code-modulated wave is multiplied with the code sequence d1 of the demodulation code to obtain the following expression:

$$m1 \times d1 = [1\ 1\ 1\ 1\ 1\ 1\ 1\ 1\ 1\ 1\ 1\ 1\ 1\ 1] \quad (3)$$

As it is evident from Expression (3), it is seen that the demodulated current I3 (FIG. 6C) of the original direct current is obtained.

As explained above, it is possible to realize accurately synchronized power transmission of a direct current without a power loss by using the code modulator 2 and the code demodulator 4 according to this embodiment. For example, it is possible to efficiently perform transmission of power in a longer time by, for example, repeatedly using the code sequence m1 of the modulation code.

Further, the code sequence m1 of the modulation code can be divided in a code sequence m1a of the former half of the code sequence m1 and a code sequence m1b of the latter half of the code sequence m1 as indicated by the following expressions:

$$m1a = [1\ -1\ 1\ 1\ 1\ -1\ -1] \quad (4)$$

$$m1b = [-1\ 1\ -1\ -1\ -1\ 1\ 1] \quad (5)$$

The code sequence m1b is a code sequence obtained by code-inverting codes of the code sequence m1a (e.g., 1 in m1a is −1 in m1b, −1 in m1a is 1 in m1b).

By deciding the code sequence m1 as a sum of the code sequences m1a and m1b in this way, an average of modulated waves changes to 0. Transmission in only an alternating current without a direct-current component is performed. There is an advantage that it is possible to perform power transmission with high transmission efficiency.

As explained above, as illustrated in FIG. 5, when the input of the code modulator 2 is the direct-current power, in the output terminals T13 and T14 of the code demodulation circuit 73 of the code demodulator 4, it is possible to extract the demodulated direct current I3 same as the generated current I1 inputted to the code modulator 2. Therefore, according to first embodiment, after the generated direct current I1 is modulated into the modulated current I2 of the code-modulated alternating current, it is possible to transmit the modulated current I2 via the power transmission line 3 and demodulate the modulated current I2 into the demodulated direct current I3.

A method of modulating and demodulating power by a power transmission system according to a modification of the first embodiment is explained. The power transmission system according to the modification of the first embodiment is configured the same as the power transmission system illustrated in FIG. 2 except a code modulation circuit of the code modulator 2 and a code demodulation circuit of the code demodulator 4.

Figure 7:
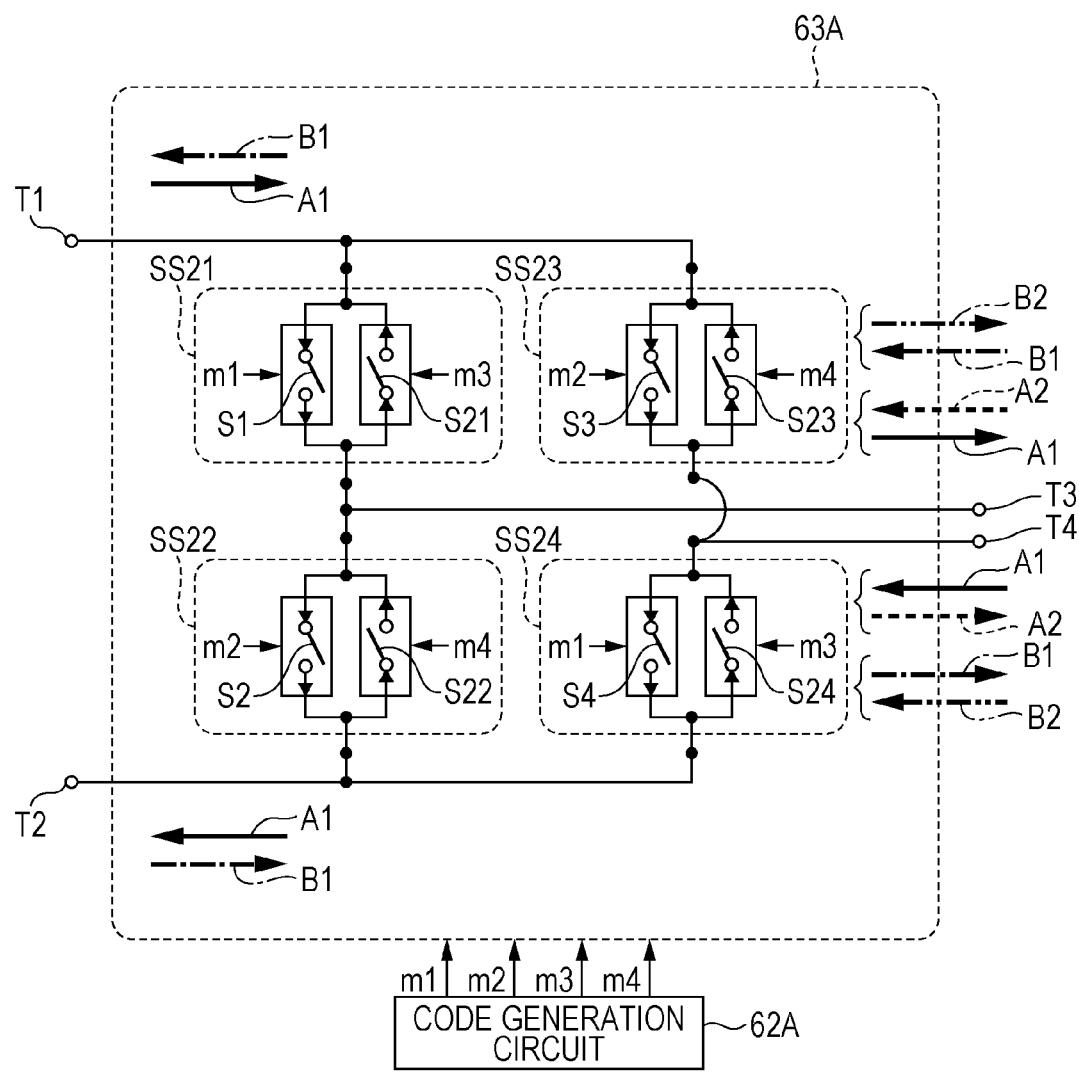
FIG. 7 is a circuit diagram illustrating the configuration of a code modulation circuit according to a modification of the first embodiment.

FIG. 7 is a circuit diagram illustrating the configuration of a code modulation circuit 63A of the power transmission system according to the modification of the first embodiment. In FIG. 7, the code modulation circuit 63A is different from the code modulation circuit 63 illustrated in FIG. 5 in the following points.

(1) The code modulation circuit 63A includes, respectively instead of the unidirectional switch elements SS1 to SS4, four bidirectional switch circuits SS21 to SS24 connected in a bridge form.

(2) The code modulation circuit 63A includes, instead of the code generation circuit 62, a code generation circuit 62A that generates four code sequences m1 to m4 and outputs the code sequences m1 to m4 to the code modulation circuit 63A as control signals.

In the code modulation circuit 63A illustrated in FIG. 7, the switch circuit SS21 includes, in addition to the switch element S1 illustrated in FIG. 5 turned on and off in response to the control signal m1, a switch element S21 having a direction opposite to the direction of the switch element S1 and connected in parallel to the switch element S1 and turned on and off in response to the control signal m3. The switch circuit SS22 includes, in addition to the switch element S2 illustrated in FIG. 5 turned on and off in response to the control signal m2, a switch element S22 having a direction opposite to the direction of the switch element S2 and connected in parallel to the switch element S2 and turned on and off in response to the control signal m4. The switch circuit SS23 includes, in addition to the switch element S3 illustrated in FIG. 5 turned on and off in response to the control signal m2, a switch element S23 having a direction opposite to the direction of the switch element S3 and connected in parallel to the switch element S3 and turned on and off in response to the control signal m4. The switch circuit SS24 includes, in addition to the switch element S4 illustrated in FIG. 5 turned on and off in response to the control signal m1, a switch element S24 having a direction opposite to the direction of the switch element S4 and connected in parallel to the switch element S4 and turned on and off in response to the control signal m3. Note that the switch elements S21 to S24 are configured by, for example, MOS transistors. The code modulation circuit 63A includes the terminals T1 and T2 connected to the generator 1 and the terminals T3 and T4 connected to the power transmission line 3. An alternating-current power from the generator 1 is inputted to the code modulation circuit 63A. After code-modulating the alternating-current power, the code modulation circuit 63A outputs a code-modulated modulated wave to the power transmission line 3.

Figure 8:
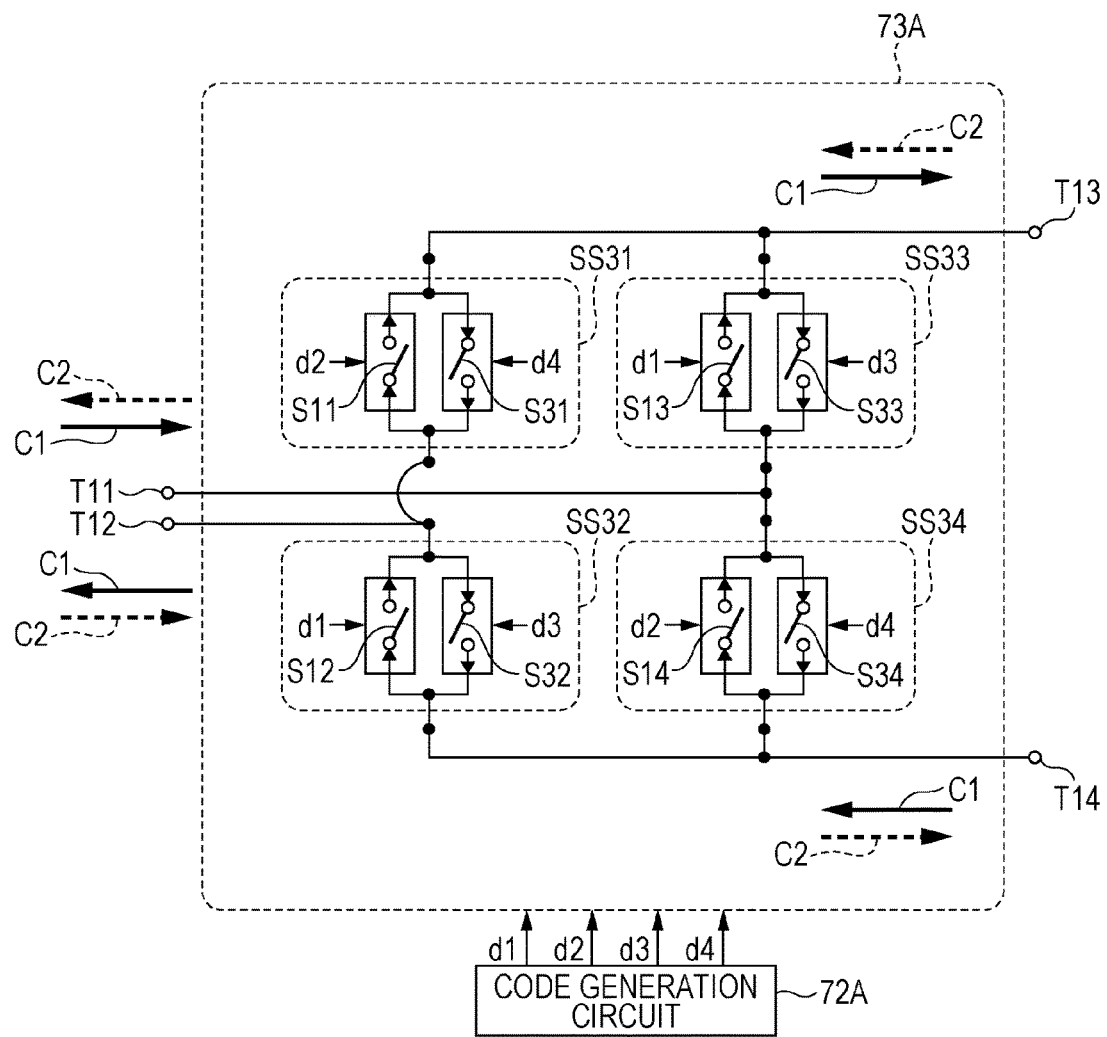
FIG. 8 is a circuit diagram illustrating the configuration of a code demodulation circuit according to the modification of the first embodiment.

FIG. 8 is a circuit diagram illustrating the configuration of the code demodulation circuit 73A of the power transmission system according to the modification of the first embodiment. In FIG. 8, for simplification illustration, the power meter 74 illustrated in FIG. 4 is omitted. In FIG. 8, the code demodulation circuit 73A is different from the code demodulation circuit 73 illustrated in FIG. 5 in the following points.

(1) The code demodulation circuit 73A includes, respectively instead of the unidirectional switch circuits SS11 to SS14, four bidirectional switch circuits SS31 to SS34 connected in a bridge form.

(2) The code demodulation circuit 73A includes, instead of the code generation circuit 72, a code generation circuit 72A that generates four code sequences d1 to d4 and outputs the code sequences d1 to d4 to the code demodulation circuit 73A as control signals.

In the code demodulation circuit 73A illustrated in FIG. 8, the switch circuit SS31 includes, in addition to the switch element S11 illustrated in FIG. 5 turned on and off in response to the control signal d2, a switch element S31 having a direction opposite to the direction of the switch element S11 and connected in parallel to the switch element S11 and turned on and off in response to the control signal d4. The switch circuit SS32 includes, in addition to the switch element S12 illustrated in FIG. 5 turned on and off in response to the control signal d1, a switch element S32 having a direction opposite to the direction of the switch element S12 and connected in parallel to the switch element S12 and turned on and off in response to the control signal d3. The switch circuit SS33 includes, in addition to the switch element S13 illustrated in FIG. 5 turned on and off in response to the control signal d1, a switch element S33 having a direction opposite to the direction of the switch element S13 and connected in parallel to the switch element S13 and turned on and off in response to the control signal d3. The switch circuit SS34 includes, in addition to the switch element S14 illustrated in FIG. 5 turned on and off in response to the control signal d2, a switch element S34 having a direction opposite to the direction of the switch element S14 and connected in parallel to the switch element S14 and turned on and off in response to the control signal d4. Note that the switch elements S31 to S34 are configured by, for example, MOS transistors. The code demodulation circuit 73A includes the terminals T11 and T12 connected to the power transmission line 3 and the terminals T13 and T14 connected to the load 5. An alternating-current code-modulated wave from the power transmission line 3 is inputted to the code demodulation circuit 73A. After code-demodulating the code-modulated wave into alternating-current demodulated power, the code demodulation circuit 73A outputs the demodulated power to the load 5.

Table 3 is a table illustrating an example of modulation codes of the code modulation circuit 63A and demodulation codes of the code demodulation circuit 73A according to an example 3 that transmit alternating-current power and receive the alternating-current power in the power transmission system according to the modification of the first embodiment. That is, Table 3 illustrates an example of code sequences m1 to m4 inputted to the bidirectional switch circuits SS21 to SS24 of the code modulation circuit 63A and code sequences d1 to d4 inputted to the bidirectional switch circuits SS31 to SS34 of the code demodulation circuit 73A.

TABLE 3

| Control signal | Code sequence |
| --- | --- |
| m1 | [c1a c0] = [1 0 1 1 1 0 0 0 0 0 0 0] |
| m2 | [c1b c0] = [0 1 0 0 0 1 1 0 0 0 0 0] |
| m3 | [c0 c1a] = [0 0 0 0 0 0 1 0 1 1 1 0 0] |
| m4 | [c0 c1b] = [0 0 0 0 0 0 0 1 0 0 0 1 1] |
| d1 | [c1a c0] = [1 0 1 1 1 0 0 0 0 0 0 0] |
| d2 | [c1b c0] = [0 1 0 0 0 1 1 0 0 0 0 0] |
| d3 | [c0 c1a] = [0 0 0 0 0 0 1 0 1 1 1 0 0] |
| d4 | [c0 c1b] = [0 0 0 0 0 0 0 1 0 0 0 1 1] |

As illustrated in Table 3, the code sequence m1 and the code sequence d1 are the same each other. The code sequence m2 and the code sequence d2 are the same each other. Similarly, the code sequence m3 and the code sequence d3 are the same each other. The code sequence m4 and the code sequence d4 are the same each other. As in the transmission of the direct-current power, concerning a relation between the code sequence c1a and the code sequence c1b, a code of the code sequence c1b is set to 0 when a code of the code sequence c1a is 1. The code of the code sequence c1b is set to 1 when the code of the code sequence c1a is 0. Time width of the code sequence c1a and the code sequence c1b are matched with a half cycle of an alternating current. That is, at time width at which an electric current in a former half portion of an alternating-current waveform is positive, the code sequence c1a and the code sequence c1b are respectively given to the code sequence m1 and the code sequence m2 and the switch elements S1 to S4 are controlled. At this point, the code sequence m3 and the code sequence m4 are always 0. The switch elements S21 to S24 are disconnected and an electric current does not flow. On the other hand, at time width at which an electric current in a latter half portion of the alternating-current waveform, the code sequence m1 and the code sequence m2 are always 0. The switch elements S1 to S4 are disconnected and an electric current does not flow. However, the code sequence c1a and the code sequence c1b are given to the code sequence m3 and the code sequence m4 and the switch elements S21 to S24 are controlled.

First, the operation of the code modulation circuit 63A is explained below. Operation performed when a positive electric current (a solid line arrow A1 and a dotted line arrow A2 in the input terminals T1 and T2 illustrated in FIG. 7) flows to the input terminals T1 and T2 is explained. In this case, when the switch elements S1 and S4, to which code 1 of the code sequence c1a (the code sequence m1 in FIG. 7) is input, are turned on, the switch elements S2 and S3, to which code 0 of the code sequence c1b (the code sequence m2 in FIG. 7) is input, are turned off. When the switch elements S1 and S4, to which code 0 of the code sequence c1a (the code sequence m1 in FIG. 7) is input, are turned off, the switch elements S2 and S3, to which code 1 of the code sequence c1b (the code sequence m2 in FIG. 7) is input, are turned on. Consequently, when the switch elements S1 and S4 are on and the switch elements S2 and S3 are off, an electric current having positive code 1 (the solid line arrow A1 in the output terminals T3 and T4 illustrated in FIG. 7) flows to the power transmission line 3. On the other hand, when the switch elements S1 and S4 are off and the switch elements S2 and S3 are on, an electric current having negative −1 in the opposite direction (the dotted line arrow A2 in the output terminals T3 and T4 illustrated in FIG. 7) flows to the power transmission line 3. Consequently, as illustrated in FIG. 9B, in response to an input of a positive electric current in an alternating current, an electric current modulated to an alternating current having +1 and −1 can be transmitted to the power transmission line 3.

Operation performed when a negative electric current (an alternate long and short dash line arrow B1 in the input terminals T1 and T2 illustrated in FIG. 7) flows to the input terminals T1 and T2 is explained below. In this case, when the switch elements S21 and S24, to which code 1 of the code sequence c1a (the code sequence m3 in FIG. 7) is input, are turned on, the switch elements S22 and S23, to which code 0 of the code sequence c1b (the code sequence m4 in FIG. 7) is input, are turned off. When the switch elements S21 and S24, to which code 0 of the code sequence c1a (the code sequence m3 in FIG. 7) is input, are turned off, the switch elements S22 and S23, to which code 1 of the code sequence c1b (the code sequence m4 in FIG. 7) is input, are turned on. Consequently, when the switch elements S21 and S24 are on and the switch elements S22 and S23 are off, an electric current having negative "−1" (the alternate long and short dash line B1 in the output terminals T3 and T4 illustrated in FIG. 7) flows to the power transmission line 3. On the other hand, when the switch elements S21 and S24 are off and the switch elements S22 and S23 are on, an electric current having positive +1 in the opposite direction (an alternate long and two short dashes line B2 in the output terminals T3 and T4 illustrated in FIG. 7) flows to the power transmission line 3. Consequently, as illustrated in FIG. 9B, in response to an input of a negative electric current in an alternating current, an electric current modulated to an alternating current of −1 and +1 can be transmitted to the power transmission line 3.

As explained with reference to FIG. 7, when a positive electric current flows to the code modulation circuit 63A and when a negative electric current flows to the code modulation circuit 63A, the electric currents can be modulated into an alternating-current modulated wave illustrated in FIG. 9B.

The operation of the code demodulation circuit 73A illustrated in FIG. 8 is explained. First, it is assumed that a positive electric current (the solid line arrow A1 in the input terminals T1 and T2 illustrated in FIG. 7) flows to the input terminals T1 and T2 of the code modulation circuit 63A. In this case, an alternating modulated current is inputted to the input terminals T11 and T12 of the code demodulation circuit 73A via the power transmission line 3. Therefore, a positive electric current (a solid line arrow C1 in the input terminals T11 and T12 illustrated in FIG. 8) and a negative electric current (a dotted line arrow C2 in the input terminals T11 and T12 illustrated in FIG. 8) are input. When demodulation operation is correctly performed in the code demodulation circuit 73A, as an electric current demodulated by the code demodulation circuit 73A, a positive electric current (the solid line arrow C1 in the output terminals T13 and T14 illustrated in FIG. 8) flows to the output terminals T13 and T14. These kinds of operation are explained below. In this case, 0 is inputted as all the code sequence d3 and the code sequence d4. All the switch elements S31 to S34 are turned off.

First, the operation of the code demodulation circuit 73A performed when a positive electric current (the solid line arrow C1 in the input terminals T11 and T12 illustrated in FIG. 8) is inputted to the input terminals T11 and T12 of the code demodulation circuit 73A is explained. A positive electric current flows to the input terminals T1 and T2 of the code modulation circuit 63A and a modulated wave (a modulated current flowing to the input terminals T11 and T12 of the code demodulation circuit 73A) is also a positive electric current. Therefore, a code of the code sequence c1a is 1. Therefore, the switch elements S12 and S13, to which code 1 of the code sequence c1a (the code sequence d1 in FIG. 8) is input, are turned on. The switch elements S11 and S14, to which code 0 of the code sequence c1b (the code sequence d2 in FIG. 8) is input, are turned off. Therefore, a positive electric current (the solid line arrow C1 in the output terminals T13 and T14 illustrated in FIG. 8) flows to the output terminals T13 and T14.

The operation of the code demodulation circuit 73A performed when a negative electric current (the dotted line arrow C2 in the input terminals T11 and T12 illustrated in FIG. 8) is inputted to the input terminals T11 and T12 of the code demodulation circuit 73A is explained. In this case, a positive electric current flows to the input terminals T1 and T2 of the code modulation circuit 63A. A modulated wave (an electric current flowing to the input terminals T11 and T12 of the code demodulation circuit 73A) is a negative electric current. Therefore, a code of the code sequence c1a is 0. Therefore, the switch elements S12 and S13, to which code 0 of the code sequence c1a (the code sequence d1 in FIG. 8) is input, are turned off. The switch elements S11 and S14, to which code 0 of the code sequence c1b (the code sequence d2 in FIG. 8) is input, are turned on. Therefore, a positive electric current (the solid line arrow C1 in the output terminals T13 and T14 in FIG. 8) flows to the output terminals T13 and T14. Consequently, as illustrated in FIG. 9C, in response to an input of a positive electric current in an alternating current (the solid line arrow A1 in the input terminals T1 and T2 illustrated in FIG. 7) to the code modulation circuit 63A, an electric current accurately demodulated to a positive electric current can be outputted to the load 5 by the code demodulation circuit 73A.

It is assumed that a negative electric current (the alternate long and short dash line B1 in the input terminals T1 and T2 illustrated in FIG. 7) flows to the input terminals T1 and T2 of the code modulation circuit 63A. In this case as well, a modulated alternating current is inputted to the input terminals T11 and T12 of the code demodulation circuit 73A via the power transmission line 3. Therefore, a positive electric current (the solid line arrow C1 in the input terminals T11 and T12 illustrated in FIG. 8) and a negative electric current (the dotted line arrow C2 in the input terminals T11 and T12 illustrated in FIG. 8) are input. When the demodulation operation is correctly performed in the code demodulation circuit 73A, as an electric current demodulated by the code demodulation circuit 73A, a negative electric current (the dotted line arrow C2 in the output terminals T13 and T14 illustrated in FIG. 8) flows in the output terminals T13 and T14. These kinds of operation are explained below. In this case, 0 is inputted as all the code sequences d1 and d2. All the switch elements S11 to S14 are turned off.

First, the operation of the code demodulation circuit 73A performed when a negative electric current (the dotted line arrow C2 in the input terminals T11 and T12 illustrated in FIG. 8; a negative electric current same as the electric current flowing to the input terminals T1 and T2 of the code modulation circuit 63A) is inputted to the input terminals T11 and T12 of the code demodulation circuit 73A is explained. In this case, a negative electric current flows to the input terminals T1 and T2 of the code modulation circuit 63A. A modulated wave (an electric current flowing to the input terminals T11 and T12 of the code demodulation circuit 73A) is also a negative electric current. Therefore, a code of the code sequence c1a is 1. Therefore, the switch elements S32 and S33, to which code 1 of the code sequence c1a (the code sequence d3 in FIG. 8) is input, are turned on. The switch elements S31 and S34, to which code 0 of the code sequence c1b (the code sequence d4 in FIG. 8) is input, are turned off. Therefore, a negative electric current (the dotted line arrow C2 in the output terminals T13 and T14 illustrated in FIG. 8) flows to the output terminals T13 and T14.

The operation of the code demodulation circuit 73A performed when a positive electric current (the solid line arrow C1 in the input terminals T11 and T12 illustrated in FIG. 8) is inputted to the input terminals T11 and T12 of the code demodulation circuit 73A is explained. In this case, a negative electric current flows to the input terminals T1 and T2 of the code modulation circuit 63A. A modulated wave (an electric current flowing to the input terminals T11 and T12 of the code demodulation circuit 73A) is a positive electric current. Therefore, a code of the code sequence c1a is 0. Therefore, the switch elements S32 and S33, to which code 0 of the code sequence c1a (the code sequence d3 in FIG. 8) is input, are turned off. The switch elements S31 and S34, to which code 1 of the code sequence c1b (the code sequence d4 in FIG. 8) is input, are turned on. Therefore, a negative electric current (the dotted line arrow C2 in the output terminals T13 and T14 illustrated in FIG. 8) flows to the output terminals T13 and T14. Consequently, as illustrated in FIG. 9C, in response to an input of a negative electric current in an alternating current (the alternate long and short dash line arrow B1 in the input terminals T1 and T2 illustrated in FIG. 7) to the code modulation circuit 63A, an electric current accurately demodulated to a negative electric current can be outputted to the load 5 by the code demodulation circuit 73A.

As explained above, with this configuration, it is possible to modulate an electric current in an alternating current into an alternating current and demodulate the alternating current via the power transmission line 3.

Table 4 is a table illustrating an example of modulation codes of the code modulation circuit 63A and demodulation codes of the code demodulation circuit 73A according to an example 4 that transmit direct-current power and receive the direct-current power in the power transmission system according to the modification of the first embodiment.

TABLE 4

| Control signal | Code sequence |
| --- | --- |
| m1 | [c1a c1b] = [1 0 1 1 1 0 0 0 1 0 0 0 1 1] |
| m2 | [c1b c1a] = [0 1 0 0 0 1 1 1 0 1 1 1 0 0] |
| m3 | [c0 c0] = [0 0 0 0 0 0 0 0 0 0 0 0 0 0] |
| m4 | [c0 c0] = [0 0 0 0 0 0 0 0 0 0 0 0 0 0] |
| d1 | [c1a c1b] = [1 0 1 1 1 0 0 0 1 0 0 0 1 1] |
| d2 | [c1b c1a] = [0 1 0 0 0 1 1 1 0 1 1 1 0 0] |
| d3 | [c0 c0] = [0 0 0 0 0 0 0 0 0 0 0 0 0 0] |
| d4 | [c0 c0] = [0 0 0 0 0 0 0 0 0 0 0 0 0 0] |

In the code modulation circuit 63A illustrated in FIG. 7 and the code demodulation circuit 73A illustrated in FIG. 8, as illustrated in Table 4, when code 0 is given to the code sequences m3, m4, d3, and d4 and the switch elements S21 to S24 and S31 to S34, to which the code sequences m3, m4, d3, and d4 are input, are turned off, a circuit configuration same as the circuit configuration of the code modulation circuit 63 and the code demodulation circuit 73 illustrated in FIG. 5 can be realized. That is, it is possible to realize direct-current power transmission illustrated in FIGS. 6A to 6C by giving code sequences consisting of the code sequences c1a and c1b respectively to the code sequences m1 and m2 and the code sequences d1 and d2 as illustrated in Table 4. Consequently, by changing the code sequences m1 to m4 and d1 to d4 using the code modulation circuit 63A illustrated in FIG. 7 and the code demodulation circuit 73A illustrated in FIG. 8, it is possible to realize an excellent power transmission system adaptable to both of direct-current power transmission and alternating-current power transmission. Examples of the direct-current generator 1 include a solar power generator. Examples of an alternating-current generator include thermal power, water power, wind power, nuclear power, and tidal power generators by rotation of turbines.

Figure 9A:
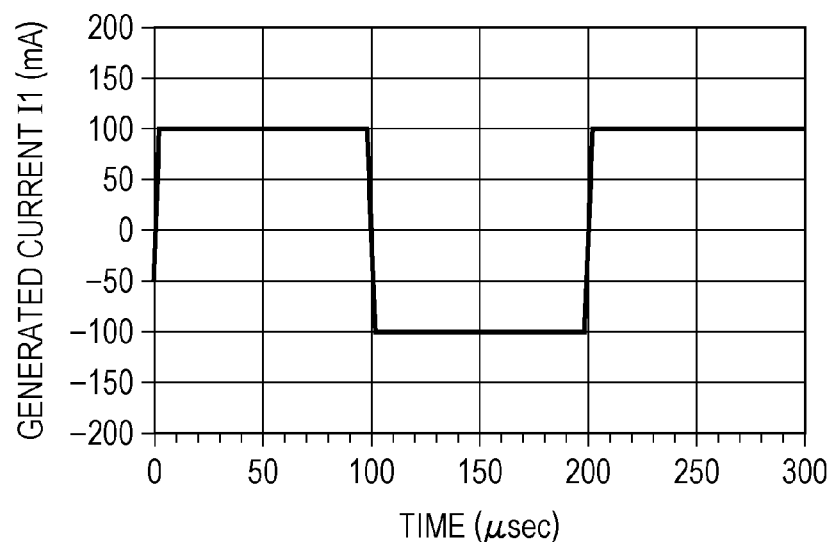
FIG. 9A is a waveform chart illustrating a waveform example of a generated current according to the modification of the first embodiment.
Figure 9B:
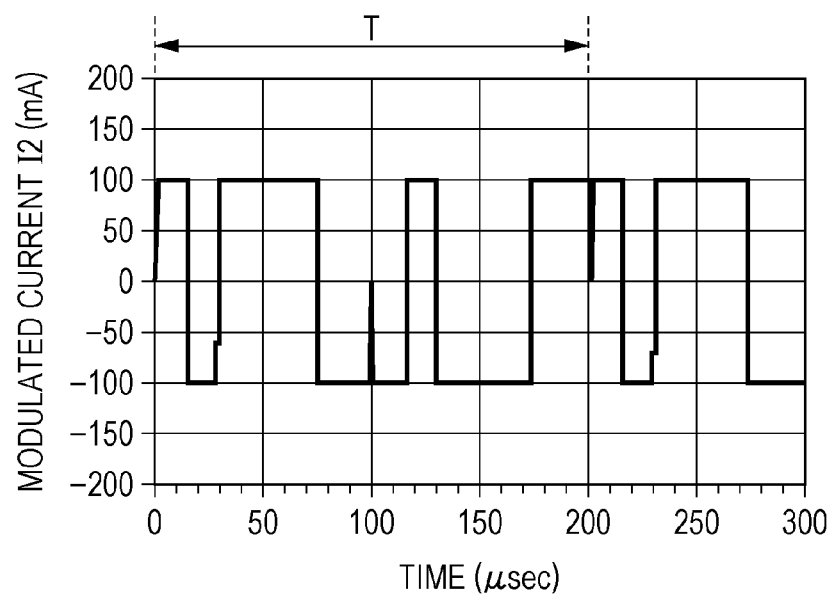
FIG. 9B is a waveform chart illustrating a waveform example of a modulated current according to the modification of the first embodiment.
Figure 9C:
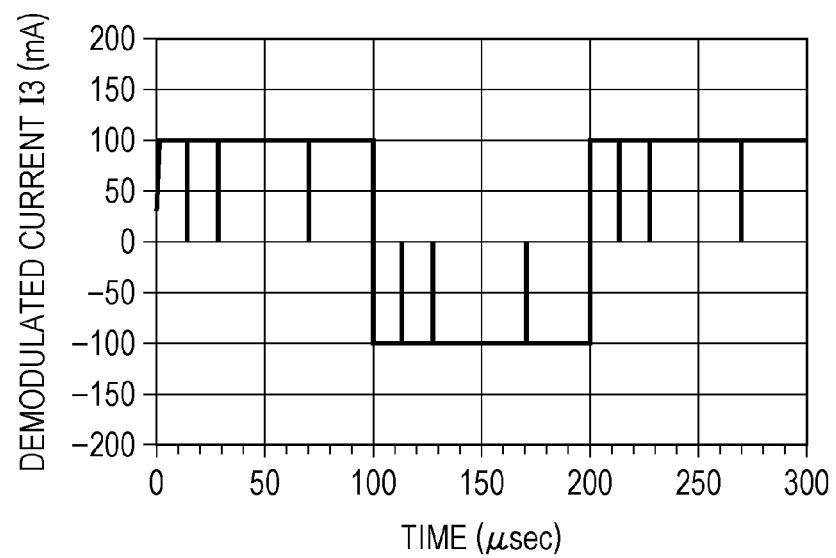
FIG. 9C is a waveform chart illustrating a waveform example of a demodulated current according to the modification of the first embodiment.

FIG. 9A is a waveform chart illustrating a signal waveform example of the generated current I1 of the power transmission system according to the modification of the first embodiment. FIG. 9B is a waveform chart illustrating a signal waveform example of the modulated current I2 of the power transmission system according to the modification of the first embodiment. FIG. 9C is a waveform chart illustrating a signal waveform example of the demodulated current I3 of the power transmission system according to the modification of the first embodiment. That is, FIGS. 9A to 9C are signal waveform examples at the time when, after the generated alternating current I1 is code-modulated by the code modulator 2, the modulated current I2 is transmitted via the power transmission line 3 and code-demodulated by the code demodulator 4.

As the generated alternating current I1, as an example, a rectangular waveform having a frequency 5 kHz that cyclically repeats positive and negative at 200 microseconds is used. At this point, as in the case where the generated direct current I1 illustrated in FIGS. 6A to 6C is code-modulated, the code demodulator 4 can restore an alternating-current power generated by the generator 1 as illustrated in FIGS. 9A to 9C by multiplying the received modulated current I2 with a demodulation code same as a modulation code used for code modulation. The modulation code m1 of the code modulator 2 is represented by the following expression as an example:

$$m1 = [1\ -1\ 1\ 1\ 1\ -1\ -1\ -1\ 1\ -1\ -1\ -1\ 1\ 1] \quad (6)$$

The generated alternating current I1 (FIG. 9A) is multiplied with the modulation code m1 having a frequency 70 kHz and including code 1 and code −1 to generate the modulated current I2 (FIG. 9B) of a code-modulated wave. In this case, time width of one code is $1/(70\ \text{kHz}) = 14.2$ microseconds. The demodulation code d1 of the code demodulator 4 is represented by the following expression:

$$d1 = m1 = [1\ -1\ 1\ 1\ 1\ -1\ -1\ -1\ 1\ -1\ -1\ -1\ 1\ 1] \quad (7)$$

As in the code demodulation for the direct-current power, a sign of a demodulation result of the following expression is obtained by multiplying the modulation code m1 with the demodulation code d1.

$$m1 \times d1 = [1\ 1\ 1\ 1\ 1\ 1\ 1\ 1\ 1\ 1\ 1\ 1\ 1\ 1] \quad (8)$$

As it is evident from Expression (8), it is seen that the original alternating-current power is obtained.

As explained above, it is possible to realize accurately synchronizing power transmission without a power loss by using the methods of the code modulation and the code demodulation according to this embodiment. It is possible to efficiently perform transmission of power in a longer time by repeating the code sequence m1 as illustrated in FIGS. 9A to 9C.

In FIGS. 7 and 8, each of the bidirectional switch circuits SS21 to SS34 includes a pair of switch elements connected in parallel to each other. However, each of the bidirectional switch circuits SS21 to SS34 may be configured by a pair of switch elements connected in series. In this case, diodes are connected in parallel to the switch elements. A pair of diodes is connected to each other in opposite directions in each of the bidirectional switch circuits. The switch elements may be configured by, for example, MOS transistors including parasitic diodes (or body diodes) connected in parallel to the switch elements. When each of the switch circuits is realized by, for example, a switch element of a MOS transistor and one diode, four semiconductor elements (two MOS transistors and two diodes) are necessary in one bidirectional switch circuit. On the other hand, as the MOS transistors, a package incorporating reverse-characteristic diodes having good characteristics is spread. The switch elements can be reduced in size by configuring one bidirectional switch circuit with two semiconductor elements.

Each of the power transmission systems 100-1 and 100-2 illustrated in FIG. 1 operates in the same manner as the power transmission system illustrated in FIG. 2. When multiple code modulators simultaneously transmit power to multiple code demodulators, a pair of a code modulator and a code demodulator that transmit and receive the power respectively use a code sequence of modulation codes and a code sequence of demodulation codes corresponding to each other. Different pairs use different code sequences. The code sequences of the different pairs may be orthogonal to each other. As the orthogonal code sequences, for example, a Gold sequence, an m sequence, and the like can be used. For example, the code modulator 2-1-1 and the code demodulator 4-1-1 respectively use a code sequence of modulation codes and a code sequence of demodulation codes corresponding to each other. The code modulator 2-1-2 and the code demodulator 4-1-2 respectively use a code sequence of modulation codes and a code sequence of demodulation codes corresponding to each other, the code sequences being different from the code sequences of the code modulator 2-1-1 and the code demodulator 4-1-1. Consequently, the code modulator 2-1-1 can transmit power to the code demodulator 4-1-1. The code modulator 2-1-2 can transmit power to the code demodulator 4-1-2. Even if the power modulated by the code modulator 2-1-1 and the power modulated by the code modulator 2-1-2 are once combined on the power transmission line 3, the combined power can be separated and demodulated by the code demodulator 4-1-1 and the code demodulator 4-1-2. In this way, the power transmission systems 100-1 and 100-2 illustrated in FIG. 1 can transmit the power in a combination of a desired generator and a desired load of the multiple generators 1-1 and 1-2 and the multiple loads 5-1-1 to 5-2-2.

An operation for highly efficiently transmitting power from the generator 1-1 to the loads 5-1-1 and 5-1-2 in the power transmission system 100-1 illustrated in FIG. 1 is explained.

FIG. 10 is a graph illustrating a relation between power transmitted by the power transmission system 100-1 illustrated in FIG. 1 and transmission efficiency. As illustrated in FIG. 10, the transmission efficiency of a path leading from the power transmitter 20-1 to the code demodulators 4-1-1 and 4-1-2 via the power transmission line 3 is a function of power transmitted via the path. The transmission efficiency is maximized when the power has a certain power value (e.g., 2 kW). That is, a power loss is minimized when the power has the power value. In order to maximize the transmission efficiency, irrespective of a power value requested from the loads 5-1-1 and 5-1-2, the controller 10-1 causes the power transmitter 20-1 to output power at the time when the transmission efficiency is maximized. When the power value requested from the loads 5-1-1 and 5-1-2 is larger than the power value at the time when the transmission efficiency is maximized, the power transmission system 100-1 acquires power compensating for power shortage from the power transmission system 100-2. When the power value requested from the loads 5-1-1 and 5-1-2 is smaller than the power value at the time when the transmission efficiency is maximized, the power transmission system 100-1 transmits surplus power to the power transmission system 100-2.

Figure 11:
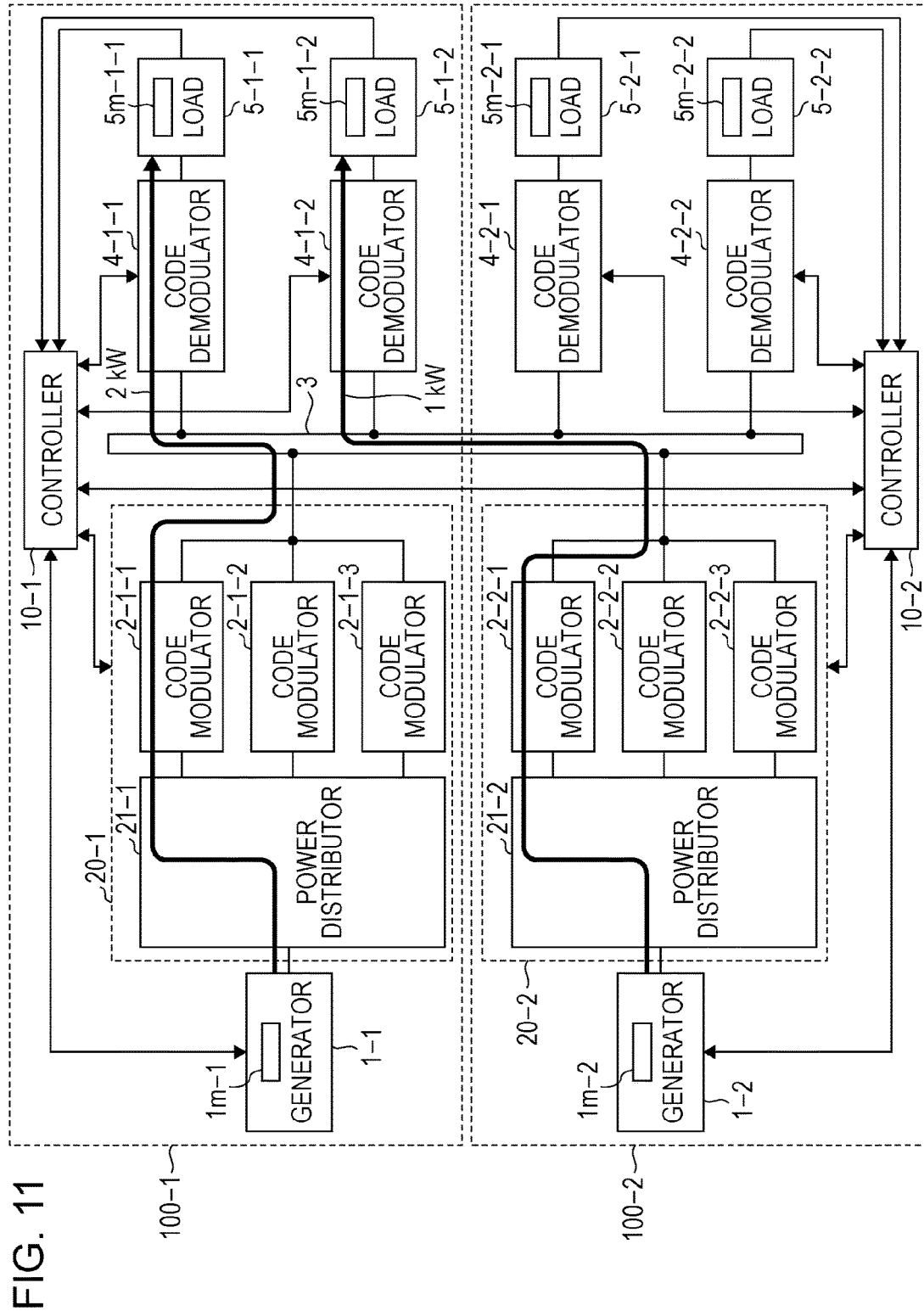
FIG. 11 is a schematic diagram illustrating an example of a path of power transmission in the power transmission system according to the first embodiment.

FIG. 11 is a schematic diagram illustrating an operation performed when power transmitted from the generator 1-1 to the loads 5-1-1 and 5-1-2 runs short in the power transmission system 100-1 illustrated in FIG. 1. It is assumed that the load 5-1-1 requests power of 2 kW and the load 5-1-2 requests power of 1 kW. If the transmission efficiency of the power transmission system 100-1 has the characteristic illustrated in FIG. 10, when the power transmitter 20-1 transmits the power of 2 kW to the load 5-1-1 via the power transmission line 3, the transmission efficiency of this path is maximized. At this point, power that should be transmitted to the load 5-1-2 runs short in the power transmission system 100-1. Therefore, the controller 10-1 requests the controller 10-2 of the power transmission system 100-2 to transmit the power compensating for power shortage. The controllers 10-1 and 10-2 determine a code sequence of modulation codes and a code sequence of demodulation codes corresponding to each other and respectively set the code sequences in the code modulator 2-2-1 of the power transmission system 100-2 and the code demodulator 4-1-2 of the power transmission system 100-1. Consequently, the power of 1 kW generated by the generator 1-2 is transmitted to the load 5-1-2 via the code modulator 2-2-1, the power transmission line 3, and the code demodulator 4-1-2. In this way, the power transmission system 100-1 can acquire the power compensating for power shortage from the power transmission system 100-2 while operating at the maximum transmission efficiency.

Figure 12:
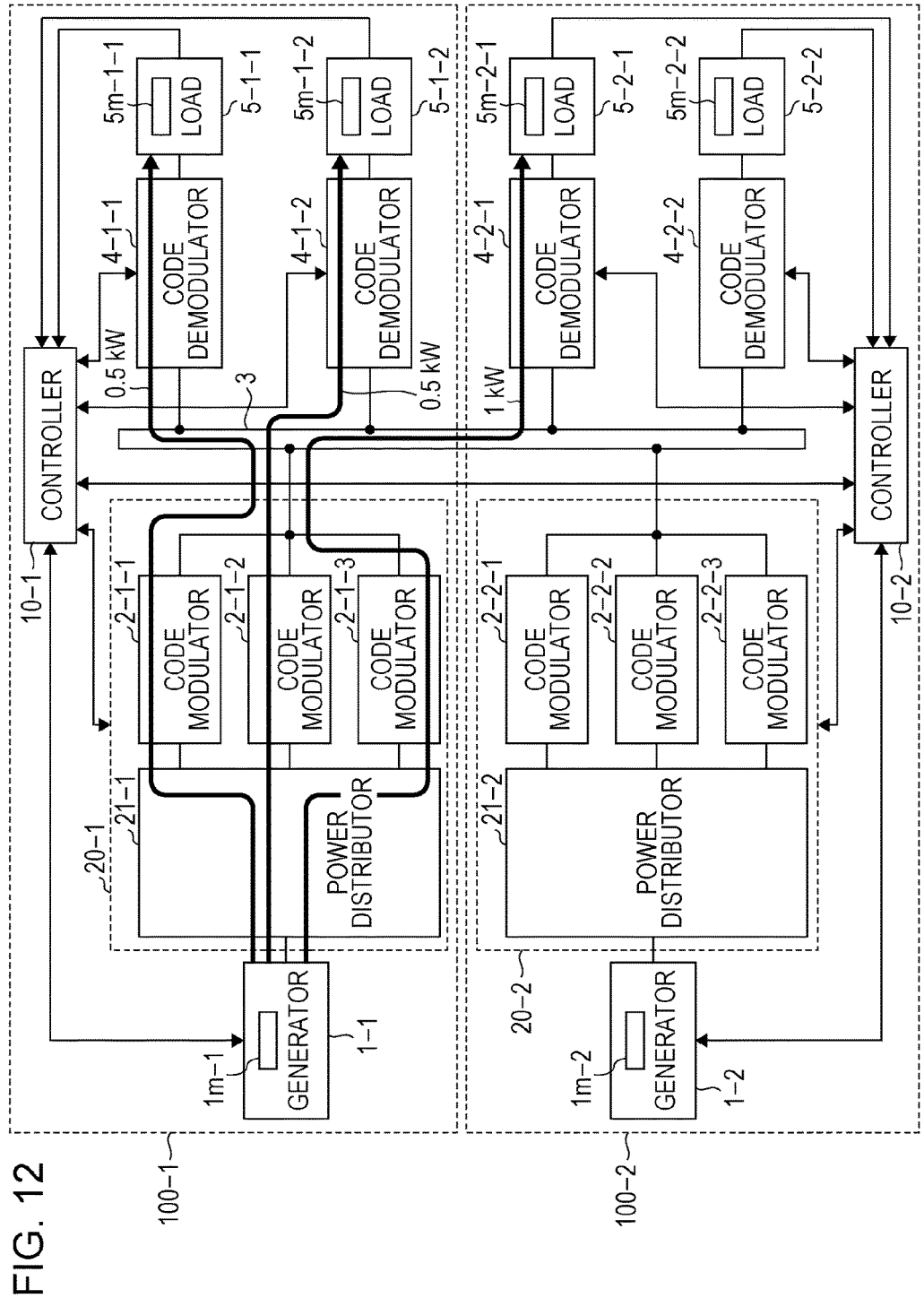
FIG. 12 is a schematic diagram illustrating an example of a path of power transmission in the power transmission system according to the first embodiment.

FIG. 12 is a schematic diagram illustrating an operation performed when a surplus occurs in power transmitted from the generator 1-1 to the loads 5-1-1 and 5-1-2 in the power transmission system 100-1 illustrated in FIG. 1. It is assumed that the load 5-1-1 requests power of 0.5 kW and the load 5-1-2 requests power of 0.5 kW. When the transmission efficiency of the power transmission system 100-1 has the characteristic illustrated in FIG. 10, in order to operate the power transmission system 100-1 at the maximum transmission efficiency, it is necessary to cause the power transmitter 20-1 to output power of 2 kW to the power transmission line 3. However, when the power transmitter 20-1 transmits the power of 0.5 kW to the load 5-1-1 via the power transmission line 3 and the power transmitter 20-1 transmits the power of 0.5 kW to the load 5-1-2 via the power transmission line 3, surplus power of 1 kW is generated. At this point, the controller 10-1 notifies the controller 10-2 of the power transmission system 100-2 of transmission of the surplus power. The controllers 10-1 and 10-2 determine a code sequence of modulation codes and a code sequence of demodulation codes corresponding to each other and respectively set the code sequences in the code modulator 2-1-3 of the power transmission system 100-1 and the code demodulator 4-2-1 of the power transmission system 100-2. Consequently, the power of 1 kW generated by the generator 1-1 is transmitted to the load 5-2-1 via the code modulator 2-1-3, the power transmission line 3, and the code demodulator 4-2-1. In this way, the power transmission system 100-1 can transmit the surplus power to the power transmission system 100-2 while operating at the maximum transmission efficiency.

Figure 13:
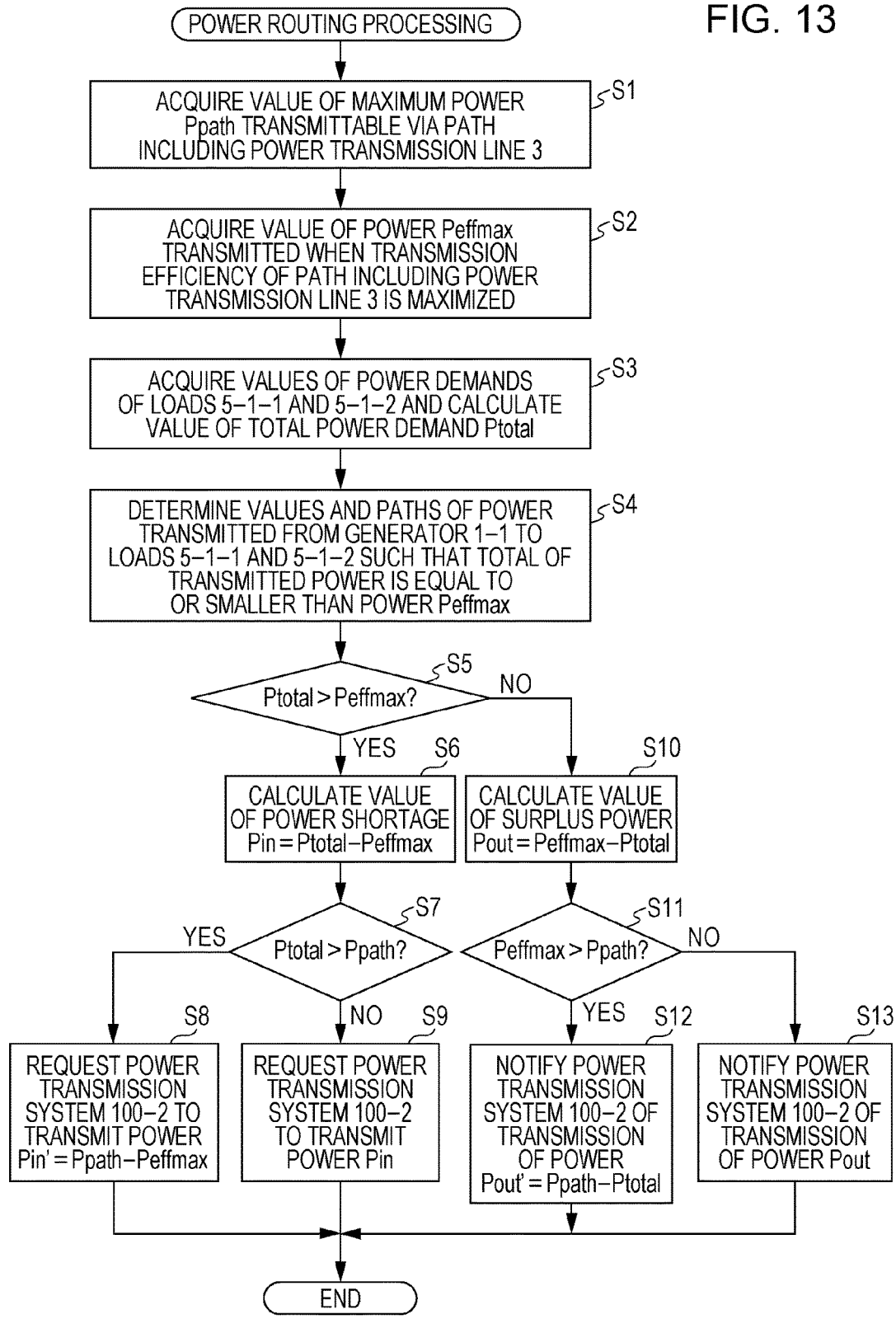
FIG. 13 is a flowchart illustrating an example of power routing processing in the power transmission system according to the first embodiment.

FIG. 13 is a flowchart illustrating power routing processing executed by the controller 10-1 of the power transmission system 100-1 illustrated in FIG. 1.

In step S1, the controller 10-1 acquires a value of maximum power Ppath transmittable via a path including the power transmission line 3. The power transmission line 3 used for transmitting power cannot transmit limitlessly large power. There is an allowable upper limit value. For example, the controller 10-1 may transmit a test signal from the power transmitter 20-1 to the code demodulators 4-1-1 and 4-1-2 via the power transmission line 3 and measure a value of the power Ppath. In this case, the controller 10-1 transmits a test signal having known power and measures power of the test signal with the power meters 74 of the code demodulators 4-1-1 and 4-1-2 to thereby measure the value of the power Ppath. The controller 10-1 may store, in a storage device on the inside, a value of the power Ppath measured in advance, for example, during manufacturing of the power transmission system 100-1.

In step S2, the controller 10-1 acquires a value of power Peffmax transmitted when the transmission efficiency of the path including the power transmission line 3 is maximized (see FIG. 10). For example, the controller 10-1 may transmit a test signal from the power transmitter 20-1 to the code demodulators 4-1-1 and 4-1-2 via the power transmission line 3 and measure the value of the power Peffmax. In this case, the controller 10-1 transmits a test signal having known power and measures power of the test signal with the power meters 74 of the code demodulators 4-1-1 and 4-1-2 to thereby measure the value of the power Peffmax. The controller 10-1 may store, on the storage device on the inside, a value of the power Peffmax measured in advance, for example, during manufacturing of the power transmission system 100-1.

In step S3, the controller 10-1 acquires values of power demand of the loads 5-1-1 and 5-1-2 from the loads 5-1-1 and 5-1-2 and calculates a value of total power demand Ptotal.

The controller 10-1 may predict the values of the power demand of the loads 5-1-1 and 5-1-2 using data in the past or the like instead of acquiring the values from the loads 5-1-1 and 5-1-2.

In step S4, the controller 10-1 determines values and paths of power transmitted from the generator 1-1 to the loads 5-1-1 and 5-1-2 such that the total of the transmitted power is equal to or smaller than the power Peffmax.

In step S5, the controller 10-1 determines whether the power Ptotal in step S3 is larger than the power Peffmax in step S2. When determining YES, the controller 10-1 proceeds to step S6. When determining NO, the controller 10-1 proceeds to step S10.

In steps S6 to S9, the controller 10-1 requests the power transmission system 100-2 to transmit power compensating for power shortage (see FIG. 11). In step S6, the controller 10-1 calculates a value of power shortage Pin=Ptotal−Peffmax. In step S7, the controller 10-1 determines whether the power Ptotal is larger than the power Ppath. When determining YES, the controller 10-1 proceeds to step S8. When determining NO, the controller 10-1 proceeds to step S9. In step S8, the controller 10-1 requests the power transmission system 100-2 to transmit power Pin'=Ppath−Peffmax. That is, the controller 10-1 requests transmission of power compensating for power shortage within a range in which the total of the power transmitted via the power transmission line 3 does not exceed the power Ppath. In step S9, the controller 10-1 requests the power transmission system 100-2 to transmit the power Pin.

In steps S10 to S13, the controller 10-1 notifies the power transmission system 100-2 on the outside of transmission of surplus power (see FIG. 12). In step S10, the controller 10-1 calculates a value of surplus power Pout=Peffmax−Ptotal. In step S11, the controller 10-1 determines whether the power Peffmax is larger than the power Ppath. When determining YES, the controller 10-1 proceeds to step S12. When determining NO, the controller 10-1 proceeds to step S13. In step S12, the controller 10-1 requests the power transmission system 100-2 to transmit power Pout'=Ppath−Ptotal. That is, the controller 10-1 notifies the transmission of the surplus power within a range in which a total of power transmitted via the power transmission line 3 does not exceed the power Ppath. In step S13, the controller 10-1 notifies the power transmission system 100-2 of transmission of the power Pout.

After steps S8 and S9, the power transmission system 100-1 acquires the power compensating for power shortage from the power transmission system 100-2. After steps S12 and S13, the power transmission system 100-1 transmits the surplus power to the power transmission system 100-2. In the power transmission system 100-1, the controller 10-1 controls the power transmitter 20-1 and the code demodulators 4-1-1 and 4-1-2 to output the power Peffmax from the power transmitter 20-1 to the power transmission line 3 and transmit the power Peffmax via the power transmission line 3. Since the power Peffmax is outputted from the power transmitter 20-1 to the power transmission line 3 and transmitted via the power transmission line 3, in the power transmission system 100-1, the transmission efficiency of the path including the power transmission line 3 is maximized.

The controller 10-1 may control the power transmitter 20-1 and the code demodulators 4-1-1 and 4-1-2 to output power within a range determined in advance with respect to the power Peffmax from the power transmitter 20-1 to the power transmission line 3 and transmit the power via the power transmission line 3. Consequently, the transmission efficiency of the path including the power transmission line 3 is substantially maximized.

As explained above, the power transmission system 100-1 illustrated in FIG. 1 can realize, without using additional charging/discharging devices, transmission of power from the generator 1-1 to the loads 5-1-1 and 5-1-2 at maximum or nearly maximum transmission efficiency of the power transmission system 100-1.

When the power compensating for power shortage cannot be acquired from the power transmission system 100-2 and when the surplus power cannot be transmitted from the power transmission system 100-2, the controller 10-1 does not maximize the transmission efficiency of the path including the power transmission line 3. At this point, the controller 10-1 causes the power transmitter 20-1 to transmit power requested from the loads 5-1-1 and 5-1-2 to the loads 5-1-1 and 5-1-2 via the power transmission line 3.

Second Embodiment

In the following explanation, a power transmission system is connected to multiple power transmission lines and transmits power using any one of the multiple power transmission lines.

Figure 14:
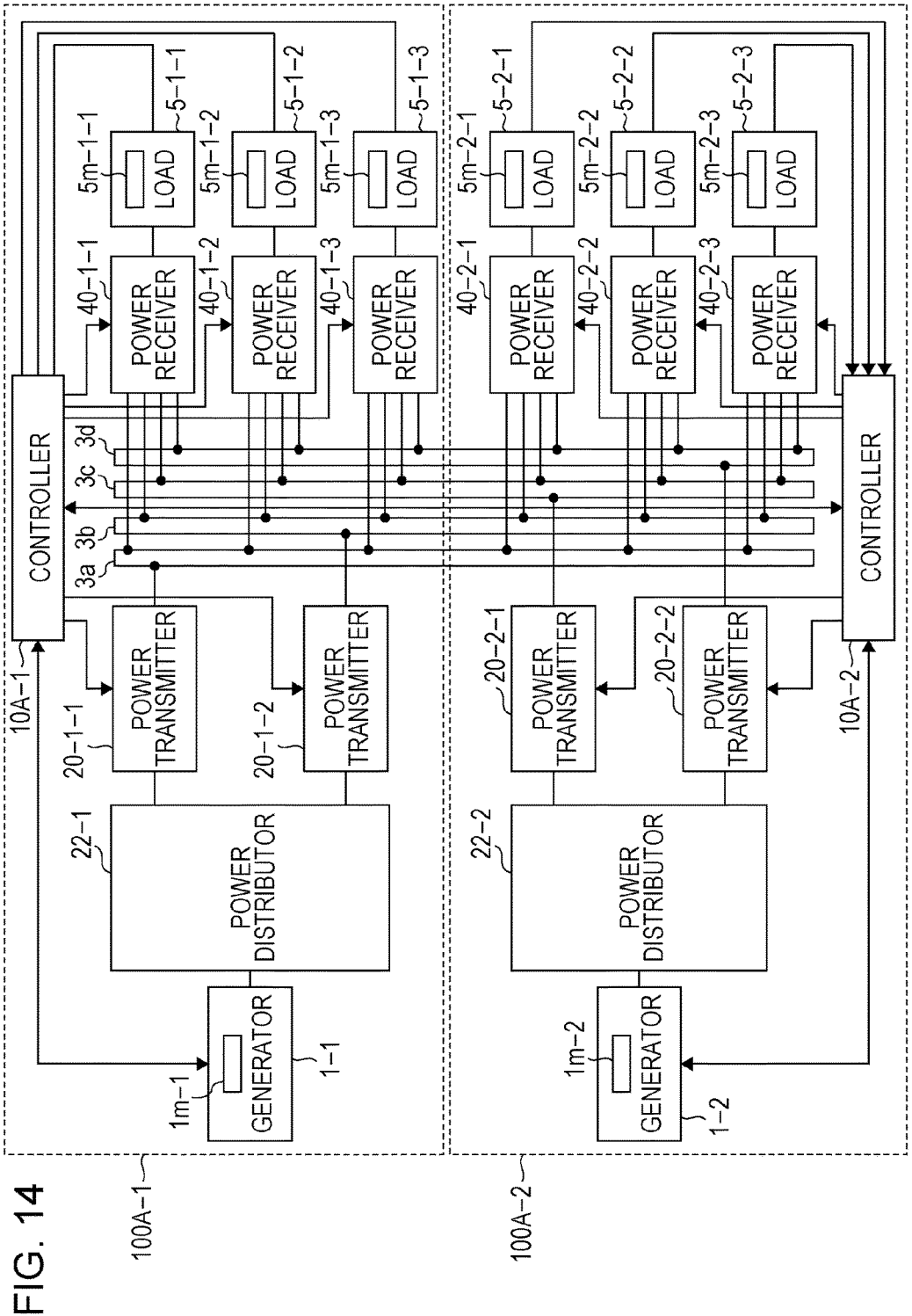
FIG. 14 is a block diagram illustrating a configuration example of a power transmission system according to a second embodiment.

FIG. 14 is a block diagram illustrating the configuration of power transmission systems 100A-1 and 100A-2 according to a second embodiment.

The power transmission system 100A-1 illustrated in FIG. 14 includes the generator 1-1, a power distributor 22-1, power transmitters 20-1-1 and 20-1-2, power transmission lines 3a to 3d, power receivers 40-1-1 to 40-1-3, loads 5-1-1 to 5-1-3, and a controller 10A-1.

The generator 1-1 illustrated in FIG. 14 is configured the same as the generator 1-1 illustrated in FIG. 1.

Each of the power transmitters 20-1-1 and 20-1-2 is configured the same as the power transmitter 20-1 illustrated in FIG. 1 and includes a power distributor and multiple (e.g., three) code modulators. The code modulators of the power transmitter 20-1-1 modulate distributed power in a predetermined modulation scheme under control by the controller 10A-1 and output the power to the power transmission line 3a. The code modulators of the power transmitter 20-1-2 modulate distributed power in the predetermined modulation scheme under the control by the controller 10A-1 and output the power to the power transmission line 3b.

The power transmission lines 3a to 3d are power lines different from one another that are likely to have transmission losses different from one another. The power transmission lines 3a and 3b respectively transmit power modulated by the power transmitters 20-1-1 and 20-1-2. As explained below, the power transmission lines 3c and 3d respectively transmit power modulated by power transmitters 20-2-1 and 20-2-2 of the power transmission system 100A-2.

Each of the power receivers 40-1-1 to 40-1-3 includes multiple (e.g., four) code demodulators respectively connected to the power transmission lines 3a to 3d or one code demodulator selectively connected to one of the power transmission lines 3a to 3d. The code demodulators of the power receivers 40-1-1 to 40-1-3 are configured the same as the code demodulator 4-1-1 illustrated in FIG. 1. Under the control by the controller 10A-1, the code demodulators demodulate power inputted from the power transmission lines 3a to 3d in a demodulation scheme corresponding to the modulation scheme. The power receivers 40-1-1 to 40-1-3 respectively output the demodulated power to the loads 5-1-1 to 5-1-3.

The loads 5-1-1 to 5-2-3 illustrated in FIG. 14 are configured the same as the loads 5-1-1 and 5-1-2 illustrated in FIG. 1.

The controller 10A-1 controls the operations of the power transmitters 20-1-1 and 20-1-2 and the power receivers 40-1-1 to 40-1-3 based on power amounts received from the power meter 1m-1 and the loads 5-1-1 to 5-2-3.

For example, the power transmission system 100A-2 illustrated in FIG. 14 may be configured the same as the power transmission system 100A-1. In this case, the power transmission system 100A-2 includes a generator 1-2, a power distributor 22-2, power transmitters 20-2-1 and 20-2-2, the power transmission lines 3a to 3d, power receivers 40-2-1 to 40-2-3, loads 5-2-1 to 5-2-3, and a controller 10A-2. However, code modulators of the power transmitters 20-2-1 and 20-2-2 respectively output modulated power to the power transmission lines 3c and 3d rather than the power transmission lines 3a and 3b.

Figure 15:
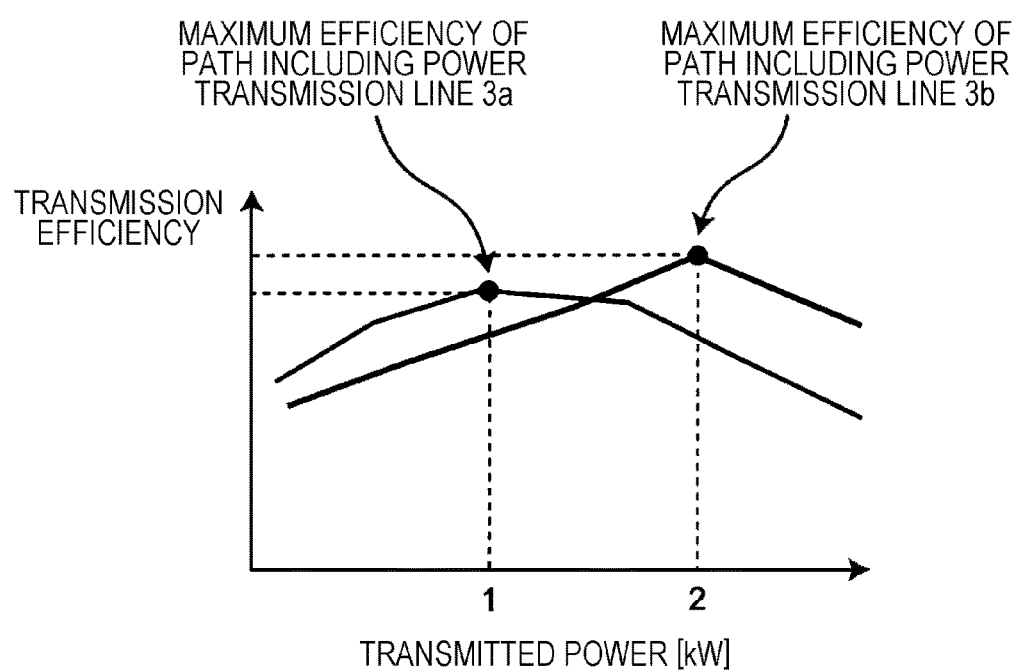
FIG. 15 is a diagram illustrating a relation between transmitted power and transmission efficiency in the power transmission system according to the second embodiment.

FIG. 15 is a graph illustrating a relation between power transmitted by the power transmission system 100A-1 illustrated in FIG. 14 and transmission efficiency. As illustrated in FIG. 15, the transmission efficiency of a path leading from the power transmitter 20-1-1 to the power receivers 40-1-1 to 40-1-3 via the power transmission line 3a is a function of power transmitted via the path. The transmission efficiency is maximized when the power has a certain power value (e.g., 1 kW). Similarly, the transmission efficiency of a path leading from the power transmitter 20-1-2 to the power receivers 40-1-1 to 40-1-3 via the power transmission line 3b is a function of power transmitted via the path. The transmission efficiency is maximized when the power has a certain power value (e.g., 2 kW). That is, when the power has these power values, power losses of the paths including the power transmission lines 3a and 3b are respectively minimized. In the example illustrated in FIG. 15, the power losses are different for each of the power transmission lines 3a and 3b. In order to maximize the transmission efficiency, irrespective of a power value requested from the loads 5-1-1 to 5-2-3, the controller 10A-1 causes the power transmitters 20-1-1 and 20-1-2 to output power at the time when the transmission efficiency of the paths including the power transmission lines 3a and 3b is maximized concerning each of the multiple power transmission lines 3a and 3b. When the power value requested from the loads 5-1-1 to 5-2-3 is larger than a total power value at the time when the transmission efficiency of the multiple paths including the power transmission lines 3a and 3b is maximized, the power transmission system 100A-1 acquires power compensating for power shortage from the power transmission system 100A-2. When the power value requested from the loads 5-1-1 to 5-2-3 is smaller than the total power value at the time when the transmission efficiency of the multiple paths including the power transmission lines 3a and 3b is maximized, the power transmission system 100A-1 transmits surplus power to the power transmission system 100A-2.

Figure 16:
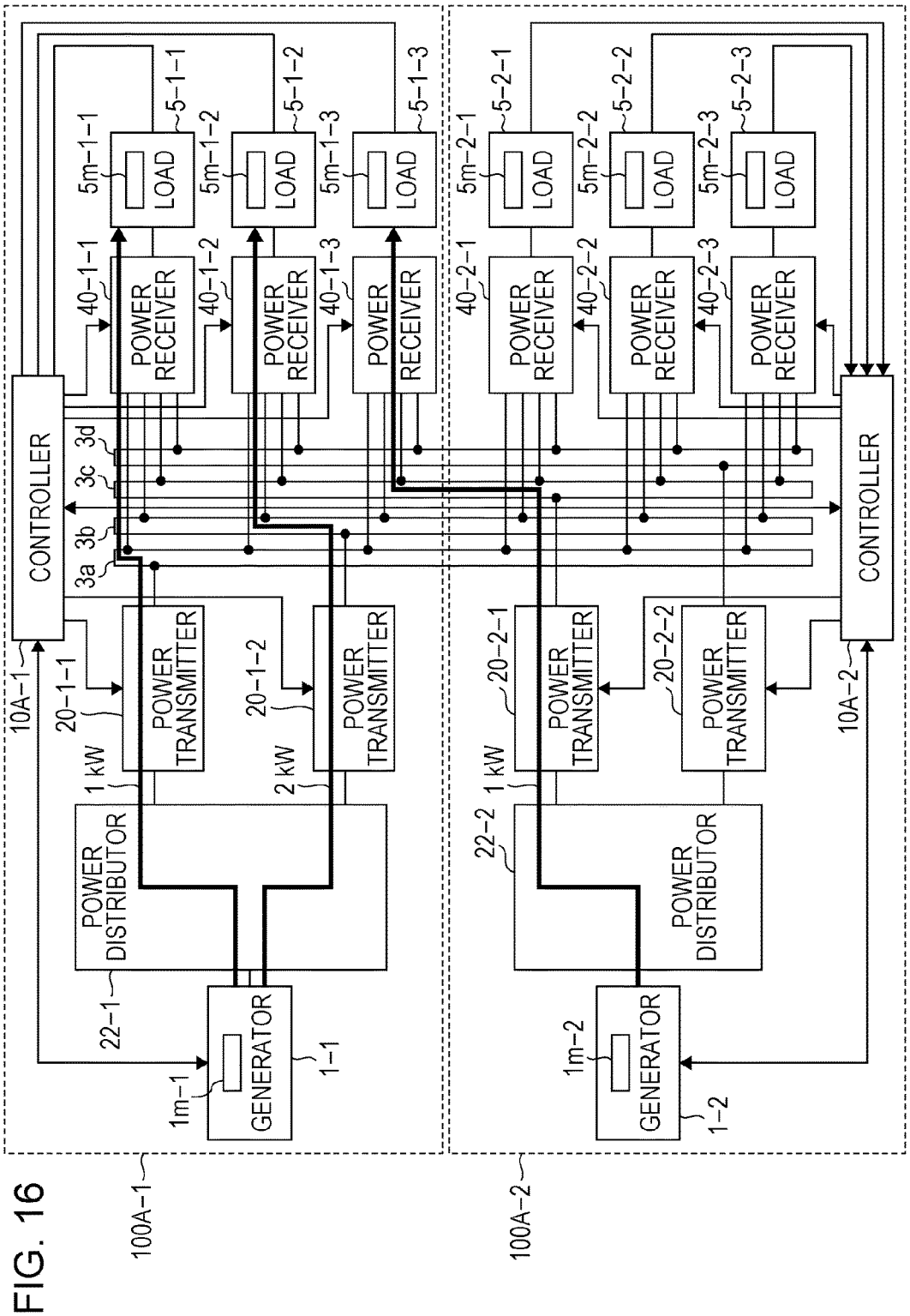
FIG. 16 is a schematic diagram illustrating an example of a path of power transmission in the power transmission system according to the second embodiment.

FIG. 16 is a schematic diagram illustrating operation performed when power transmitted from the generator 1-1 to the loads 5-1-1 to 5-2-3 runs short in the power transmission system 100A-1 illustrated in FIG. 14. It is assumed that the load 5-1-1 requests power of 1 kW, the load 5-1-2 requests power of 2 kW, and the load 5-1-3 requests power of 1 kW. If the transmission efficiency of the power transmission system 100A-1 has the characteristic illustrated in FIG. 15, when the power transmitter 20-1-1 transmits the power of 1 kW to the load 5-1-1 via the power transmission line 3a, the transmission efficiency of this path is maximized. When the power transmitter 20-1-2 transmits the power of 2 kW to the load 5-1-2 via the power transmission line 3b, the transmission efficiency of this path is maximized. At this point, since power that should be transmitted to the load 5-1-3 runs short in the power transmission system 100A-1, the controller 10A-1 requests the controller 10A-2 of the power transmission system 100A-2 to transmit the power compensating for power shortage. The controllers 10A-1 and 10A-2 determine a code sequence of modulation codes and a code sequence of demodulation codes corresponding to each other. The controller 10A-2 sets the determined code sequence of the modulation codes in the code modulator of the power transmitter 20-2-1. The controller 10A-1 sets the determined code sequence of the demodulation codes in the code demodulator of the power receiver 40-1-3. Consequently, the power of 1 kW generated by the generator 1-2 is transmitted to the load 5-1-3 via the power transmitter 20-2-1, the power transmission line 3c, and the power receiver 40-1-3. The controller 10A-2 may set the determined code sequence of the modulation codes in the code modulator of the power transmitter 20-2-2. In this case, the power of 1 kW generated by the generator 1-2 is transmitted to the load 5-1-3 via the power transmitter 20-2-2, the power transmission line 3d, and the power receiver 40-1-3. In this way, the power transmission system 100A-1 can acquire the power compensating for power shortage from the power transmission system 100A-2 while operating at the maximum transmission efficiency.

Figure 17:
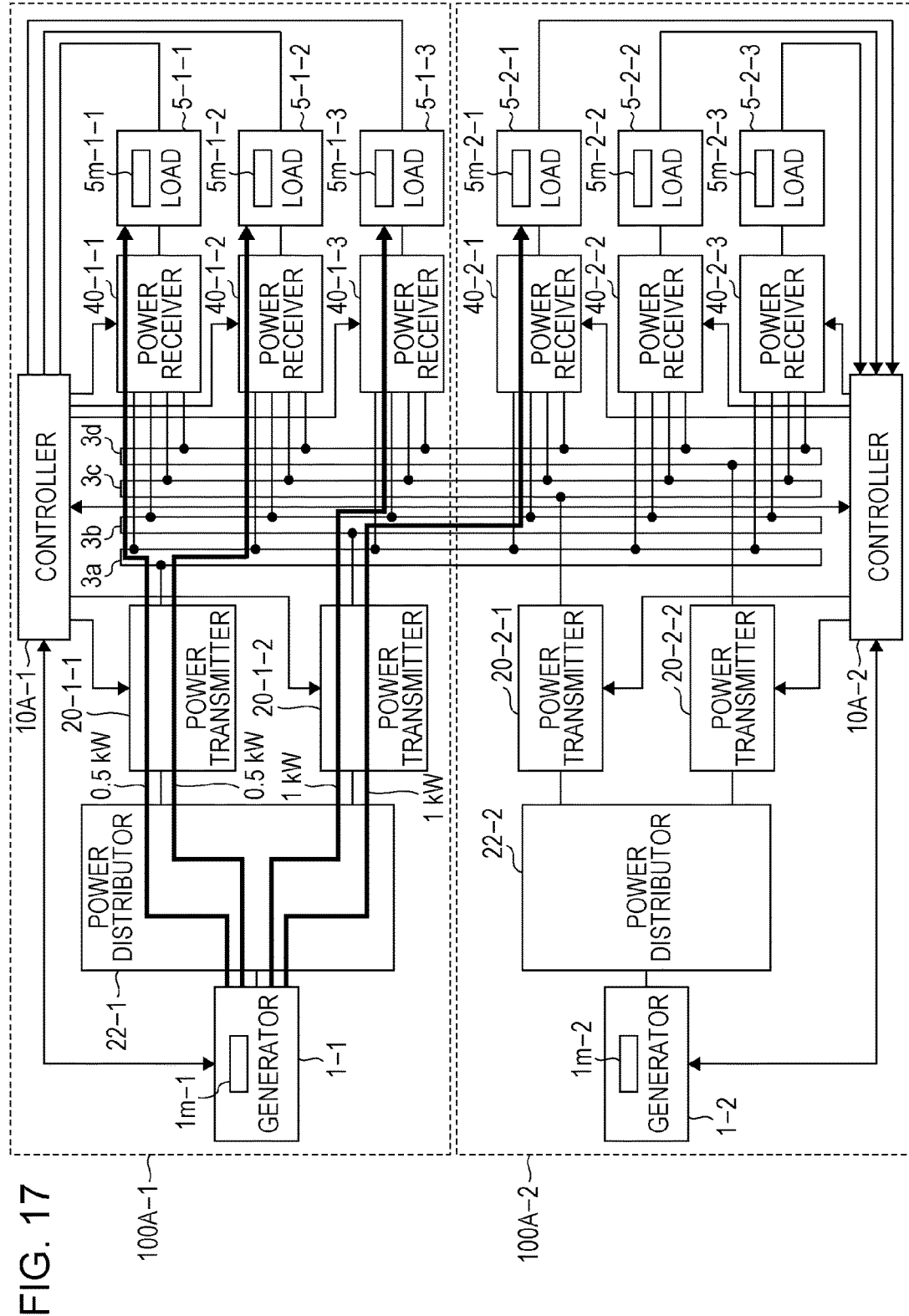
FIG. 17 is a schematic diagram illustrating an example of a path of power transmission in the power transmission system according to the second embodiment.

FIG. 17 is a schematic diagram illustrating operation performed when a surplus occurs in power transmitted from the generator 1-1 to the loads 5-1-1 to 5-2-3 in the power transmission system 100A-1 illustrated in FIG. 14.

It is assumed that the load 5-1-1 requests power of 0.5 kW, the load 5-1-2 requests power of 0.5 kW, and the load 5-1-3 requests power of 1 kW. When the transmission efficiency of the power transmission system 100A-1 has the characteristic illustrated in FIG. 15, in order to operate the power transmission system 100A-1 at the maximum transmission efficiency, it is necessary to cause the power transmitter 20-1-1 to output the power of 1 kW to the power transmission line 3a and cause the power transmitter 20-1-2 to output power of 2 kW to the power transmission line 3b. However, when the power transmitter 20-1-1 transmits the power of 0.5 kW to the load 5-1-1 via the power transmission line 3a, the power transmitter 20-1-1 transmits the power of 0.5 kW to the load 5-1-2 via the power transmission line 3a, and the power transmitter 20-1-2 transmits the power of 1 kW to the load 5-1-3 via the power transmission line 3b, surplus power of 1 kW is generated. At this point, the controller 10A-1 notifies the controller 10A-2 of the power transmission system 100A-2 of transmission of the surplus power. The controllers 10A-1 and 10A-2 determine a code sequence of modulation codes and a code sequence of demodulation codes corresponding to each other. The controller 10A-1 sets the determined code sequence of the modulation codes in the code modulator of the power transmitter 20-1-2. The controller 10A-2 sets the determined code sequence of the demodulation codes in the code demodulator of the power receiver 40-2-1. Consequently, the power of 1 kW generated by the generator 1-1 is transmitted to the load 5-2-1 via the power transmitter 20-1-2, the power transmission line 3b, and the power receiver 40-2-1. The controller 10A-2 may set the determined code sequence of the demodulation codes in the code demodulator of the power receiver 40-2-2 or 40-2-3. In this case, the power of 1 kW generated by the generator 1-1 is transmitted to the load 5-2-2 or 5-2-3 via the power transmitter 20-1-2, the power transmission line 3b, and the power receiver 40-2-2 or 40-2-3. In this way, the power transmission system 100A-1 can transmit the surplus power to the power transmission system 100A-2 while operating at the maximum transmission efficiency.

FIG. 18 is a flowchart illustrating a first portion of power routing processing executed by the controller 10A-1 of the power transmission system 100A-1 illustrated in FIG. 14. FIG. 19 is a flowchart illustrating a second portion of the power routing processing executed by the controller 10A-1 of the power transmission system 100A-1 illustrated in FIG. 14.

In step S21 in FIG. 18, the controller 10A-1 acquires a value of maximum power Ppath_a transmittable via a path including the power transmission line 3a. Step S21 is the same as step S1 in FIG. 13. In step S22, the controller 10A-1 acquires a value of power Peffmax_a transmitted when the transmission efficiency of the path including the power transmission line 3a is maximized. Step S22 is the same as step S2 in FIG. 13.

In step S23, the controller 10A-1 acquires a value of maximum power Ppath_b transmittable via a path including the power transmission line 3b. Step S23 is the same as the step S1 in FIG. 13. In step S24, the controller 10A-1 acquires a value of power Peffmax_b transmitted when the transmission efficiency of the path including the power transmission line 3b is maximized. Step S24 is the same as step S2 in FIG. 13.

In step S25, the controller 10A-1 acquires values of power demand of the loads 5-1-1 to 5-2-3 from the loads 5-1-1 to 5-2-3 and calculates a value of total power demand Ptotal.

In step S26, the controller 10A-1 determines values and paths of power transmitted from the generator 1-1 to the loads 5-1-1 to 5-2-3 such that a total of power transmitted via the path including the power transmission line 3a is equal to or smaller than the power Peffmax_a and a total of power transmitted via the path including the power transmission line 3b is equal to or smaller than the power Peffmax_b.

In step S27 in FIG. 19, the controller 10A-1 determines whether the power Ptotal in step S25 is larger than a total of the power Peffmax_a in step S22 and the power Peffmax_b in step S24. When determining YES in step S27, the controller 10A-1 proceeds to step S28. When determining NO, the controller 10A-1 proceeds to step S33.

In steps S28 to S32, the controller 10A-1 requests the power transmission system 100A-2 to transmit power compensating for power shortage (see FIG. 16). In step S28, the controller 10A-1 calculates a value of power shortage Pin=Ptotal−(Peffmax_a+Peffmax_b). In step S29, the controller 10A-1 acquires, from the controller 10A-2, a value of surplus power Pres of the power transmission system 100A-2 transmittable from the power transmission system 100A-2 to the power transmission system 100A-1 via the power transmission lines 3c and 3d. In step S30, the controller 10A-1 determines whether the power Pin is larger than the power Pres. When determining YES in step S30, the controller 10A-1 proceeds to step S31. When determining NO, the controller 10A-1 proceeds to step S32. In step S31, the controller 10A-1 requests the power transmission system 100A-2 to transmit power Pin'=Pres. That is, the controller 10A-1 requests transmission of the power compensating for power shortage within a range in which a total of power transmitted via the power transmission lines 3c and 3d do not exceed maximum power transmittable via a path including the power transmission lines 3c and 3d. In step S32, the controller 10A-1 requests the power transmission system 100A-2 to transmit the power Pin.

In steps S33 to S36, the controller 10A-1 notifies the power transmission system 100A-2 of transmission of the surplus power (see FIG. 17). In step S33, the controller 10A-1 calculates a value of surplus power Pout=(Peffmax_a+Peffmax_b)−Ptotal. In step S34, the controller 10A-1 determines whether power (Peffmax_a+Peffmax_b) is larger than power (Ppath_a+Ppath_b). When determining YES in step S34, the controller 10A-1 proceeds to step S35. When determining NO, the controller 10A-1 proceeds to step S36. In step S35, the controller 10A-1 notifies the power transmission system 100A-2 of transmission of power Pout'=(Ppath_a+Ppath_b)−Ptotal. That is, the controller 10A-1 notifies the transmission of the surplus power in a range in which a total of power transmitted via the power transmission lines 3a and 3b does not exceed power (Ppath_a+Ppath_b). In step S36, the controller 10A-1 notifies the power transmission system 100A-2 of transmission of the power Pout.

After steps S31 and S32, the power transmission system 100A-1 acquires the power compensating for power shortage from the power transmission system 100A-2 via the power transmission lines 3c and 3d. After steps S35 and S36, the power transmission system 100A-1 transmits the surplus power to the power transmission system 100A-2 via the power transmission lines 3a and 3b. In the power transmission system 100A-1, the controller 10A-1 controls the power transmitters 20-1-1 and 20-1-2 and the power receivers 40-1-1 to 40-1-3 to output the power Peffmax_a from the power transmitter 20-1-1 to the power transmission line 3a and transmit the power Peffmax_a via the power transmission line 3a and output the power Peffmax_b from the power transmitter 20-1-2 to the power transmission line 3b and transmit the power Peffmax_b via the power transmission line 3b. Since the power Peffmax_a is outputted from the power transmitter 20-1-1 to the power transmission line 3a and transmitted via the power transmission line 3a, in the power transmission system 100A-1, the transmission efficiency of the path including the power transmission line 3a is maximized. Since the power Peffmax_b is outputted from the power transmitter 20-1-2 to the power transmission line 3b and transmitted via the power transmission line 3b, in the power transmission system 100A-1, the transmission efficiency of the path including the power transmission line 3b is maximized.

The controller 10A-1 may control the power transmitter 20-1-1 and the power receivers 40-1-1 to 40-1-3 to output power in a range determined in advance with respect to the power Peffmax_a from the power transmitter 20-1-1 to the power transmission line 3a and transmit the power via the power transmission line 3a. Consequently, the transmission efficiency of the path including the power transmission line 3a is substantially maximized. Similarly, the controller 10A-1 may control the power transmitter 20-1-2 and the power receivers 40-1-1 to 40-1-3 to output power within a range determined in advance with respect to the power Peffmax_b from the power transmitter 20-1-2 to the power transmission line 3*b* and transmit the power via the power transmission line 3*b*. Consequently, the transmission efficiency of the path including the power transmission line 3*b* is substantially maximized.

As explained above, the power transmission system 100A-1 illustrated in FIG. 1 can realize, without using additional charging/discharging devices, transmission of power from the generator 1-1 to the loads 5-1-1 and 5-2-3 at maximum or nearly maximum transmission efficiency of the power transmission system 100A-1.

When the power compensating for power shortage cannot be acquired from the power transmission system 100A-2 and when the surplus power cannot be transmitted to the power transmission system 100A-2, the controller 10A-1 does not have to maximize the transmission efficiency of the path including the power transmission lines 3*a* and 3*b*. At this point, the controller 10A-1 causes the power transmitters 20-1-1 and 20-1-2 to transmit power requested from the loads 5-1-1 to 5-2-3 to the loads 5-1-1 to 5-2-3 via the power transmission lines 3*a* and 3*b*.

<Modifications>

In the first and second embodiments, the power transmission systems 100-2 and 100A-2 on the outside of the power transmission systems 100-1 and 100A-1 respectively have the same configurations as the power transmission systems 100-1 and 100A-1. However, the power transmission systems 100-2 and 100A-2 do not have to have the same configurations. If power running short in the power transmission systems 100-1 and 100A-1 is transmitted to the power transmission systems 100-1 and 100A-1 and surplus power of the power transmission systems 100-1 and 100A-1 is received from the power transmission systems 100-1 and 100A-1, the power transmission systems on the outside of the power transmission systems 100-1 and 100A-1 may have any configuration.

In the first to second embodiments, the example is explained in which the power transmission systems 100-1 and 100A-1 include the one generator and the two or three loads. However, the configuration of the power transmission systems 100-1 and 100A-1 is not limited to this. It is also possible to configure a power transmission system including one generator and four or more loads or including two or more generators and two or more loads. In this case, it is possible to perform a large number of power transmissions collectively in one transmission line. There are effects such as a reduction in cost through a reduction in laying cost of transmission lines and a reduction in the number of the transmission lines.

The power transmission systems may include any power supplies such as power storage devices instead of the generators 1-1 and 1-2. At least one of one or more power supplies may be a direct-current power supply or may be an alternating-current power supply.

Note that, the power transmission systems according to the first to second embodiments, as an example, a direct current and/or an alternating current are modulated. However, the power transmission system is not limited to this. It is also possible to modulate a direct-current voltage or an alternating-current voltage. The same effect can be obtained.

It should be noted that comprehensive or specific embodiments may be implemented as a system, a method, an integrated circuit, a computer program, a storage medium, or any selective combination thereof.

Overview of the Embodiments

A power transmission system according to a first aspect is a power transmission system that transmits power from at least one power supply to a plurality of loads, the power transmission system including:

at least one power transmission line;

at least one power transmitter that modulates power inputted from the power supply in a predetermined modulation scheme and outputs the power to the power transmission line;

a plurality of power receivers that demodulate the power inputted from the power transmission line in a demodulation scheme corresponding to the modulation scheme and output the power to the plurality of loads, respectively; and a controller that controls the power transmitter and the power receivers, wherein the power transmission system is connected to an external power transmission system via the power transmission line, and the controller controls the power transmitter and the power receivers such that power at a time when transmission efficiency of a path including the power transmission line is maximized is transmitted via the power transmission line, when a total power demand by the plurality of loads is larger than the power at the time when the transmission efficiency of the path including the power transmission line is maximized, requests the external power transmission system to transmit power compensating for power shortage, and when the total power demand by the plurality of loads is smaller than the power at the time when the transmission efficiency of the path including the power transmission line is maximized, notifies the external power transmission system of transmission of surplus power.

According to a second aspect, in the power transmission system according to the first aspect, the controller controls the power transmitter and the power receivers such that power equal to or smaller than a maximum of power transmittable via the path including the power transmission line is transmitted via the power transmission line.

According to a third aspect, in the power transmission according to the first or second aspect, the power transmission system includes a plurality of the power transmission lines, and the controller controls the power transmitter and the power receivers such that power at a time when transmission efficiency of the path including the power transmission line is maximized for each of at least two of the plurality of power transmission lines is transmitted via the power transmission line when total power demand by the plurality of loads is larger than total power at a time when transmission efficiency of a plurality of paths including the at least two power transmission lines is maximized, requests the external power transmission system to transmit power compensating for power shortage, and when the total power demand by the plurality of loads is smaller than the total power at the time when the transmission efficiency of the plurality of paths including the at least two power transmission lines is maximized, notifies the external power transmission system of transmission of surplus power.

According to a fourth aspect, in the power transmission system according to any one of the first to third aspects, the modulation scheme and the demodulation scheme are respectively a code modulation scheme and a code demodulation scheme based on a predetermined code sequence.

According to a fifth aspect, in the power transmission system according to any one of the first to fourth aspects, at least one of the power supplies is a direct-current power supply.

According to a sixth aspect, in the power transmission system according to any one of the first to fifth aspects, at least one of the power supplies is an alternating-current power supply.

<Supplements>

The power transmission system 100-1 illustrated in FIG. 1 includes the power transmitter 20-1 including the code modulator 2-1-1, the power receiver including the code demodulator 4-1-1, the power receiver including the code demodulator 4-1-2, the power transmission line 3, and the controller 10-1.

The power transmitter 20-1 is connected to the generator 1-1. The code demodulators 4-1-1 and 4-1-2 are respectively connected to the loads 5-1-1 and 5-1-2.

The code modulator 2-1-1 is an example of the "modulator" in the present disclosure. The code demodulator 4-1-1 is an example of the "demodulator" in the present disclosure. In FIG. 1, the power receiver includes only the code demodulator. However, the power receiver is not limited to this.

The power transmission line 3 connects the power transmitter 20-1 and the code demodulators 4-1-1 and 4-1-2.

In FIG. 1, the power transmission line 3 extends from one power transmitter 20-1 and branches to two lines. One branched line returns to the code demodulator 4-1-1. The other branched line leads to the code demodulator 4-1-2. In the above explanation, for convenience, the power transmission line including multiple branched lines is explained as one power transmission line. However, the number and connection of power transmission lines are not limited to specific forms. The power transmission line 3 is an example of the "one or more power transmission lines".

The controller 10-1 controls the power transmitter 20-1 and the code demodulators 4-1-1 and 4-1-2.

As indicated by steps S2 and S3 in FIG. 13, the controller 10-1 acquires information on power for maximizing the transmission efficiency in the power transmission line 3 (i.e., the optimum power Peffmax) and information on multiple kinds of power respectively requested by the loads 5-1-1 and 5-1-2 (i.e., multiple power demands). Note that the "optimum power" in the present disclosure only has to be power, the transmission efficiency of which in the one or more power transmission lines is predicted to be maximized. The other limitations are not intended.

In this case, the controller 10-1 may acquire, for example, a table or a function indicating a correspondence relation between at one or more paths selected from multiple paths on the power transmission line 3 and transmission efficiency at the time when transmission power is transmitted via this path (or these paths). A path and/or the optimum power Peffmax for maximizing the transmission efficiency may be determined using the table or the function.

As indicated by step S4 in FIG. 13, the controller 10-1 paths predetermined transmission power from the power transmitter 20-1 to at least one of the code demodulators 4-1-1 and 4-1-2 based on the information on the optimum power Peffmax. At this point, the predetermined transmission power is set to a value equal to or smaller than the optimum power Peff.

In the present disclosure, the term "based on information on X" is not limited to using only the information on X and includes using the information on X and other information.

For example, in step S4, information on multiple power demands may be used other than the information on the optimum power Peffmax.

As indicated by steps S5 to S9 in FIG. 13, when the total Ptotal of the multiple power demands is larger than the optimum power Peffmax (YES in step S5), the controller 10-1 requests the power transmission system 100-2 to supply the power Pin' or Pin to the power transmission line 3. The power transmission system 100-2 controls the distribution of the power from the generator 1-2 with the controller 10-2 different from the controller 10-1. The generator 1-2 is an example of the "other power supply" in the present disclosure. The controller 10-2 is an example of the "other controller" in the present disclosure. The power Pin' or Pin is an example of the "supplementary power" in the present disclosure. As illustrated in FIG. 1, the power transmission line 3 may be shared by the power transmission systems 100-1 and 100-2.

As indicated by steps S5 and S10 to S13 in FIG. 13, when the total Ptotal of the multiple power demands is smaller than the optimum power Peffmax (NO in step S5), the controller 10-1 notifies the power transmission system 100-2 that the power Pout' or Pout can be used. The power Pout' or Pout is an example of the "surplus power" in the present disclosure.

Note that the operation of the controller in the present disclosure is not limited to the specific example illustrated in FIG. 13. For example, the routing of the transmission power may be executed after the request of the supplementary power and the notification of the surplus power. For example, at least steps S1, S7 to S9, and S11 to S13 among the steps illustrated in FIG. 13 are optional steps.

The controller 10-1 may establish routing between a selected code modulator and a selected code demodulator by respectively inputting a modulation signal and a demodulation signal associated with each other to the selected code modulator and the selected code demodulator. In this case, the modulation signal includes a modulation code sequence and the demodulation signal includes a demodulation code sequence. In the above explanation, the modulation code sequence and the demodulation code sequence include the same code sequence. However, the modulation code sequence and the demodulation code sequence are not limited to this.

The power transmission system 100A-1 illustrated in FIG. 16 includes the power transmitters 20-1-1 and 20-1-2, the power receivers 40-1-1, 40-1-2, and 40-1-3, the power transmission lines 3a and 3b, and the controller 10A-1.

The power transmitters 20-1-1 and 20-1-2 are connected to the generator 1m-1. The power receivers 40-1-1, 40-1-2, and 40-1-3 are respectively connected to loads 5-1-1, 5-1-2, and 5-1-3. Each of the power transmitters 20-1-1 and 20-1-2 includes the code modulator illustrated in FIG. 1. Each of the power receivers 40-1-1, 40-1-2, and 40-1-3 includes the code demodulator illustrated in FIG. 1.

The power transmitter 20-1-1 is an example of the "first power transmitter" in the present disclosure. The power transmitter 20-1-2 is an example of the "second power transmitter" in the present disclosure.

The power transmission line 3a connects the power transmitter 20-1-1 and the power receivers 40-1-1, 40-1-2, and 40-1-3. The power transmission line 3b connects the power transmitter 20-1-2 and the power receivers 40-1-1, 40-1-2, and 40-1-3.

The power transmission line 3a is an example of the "one or more first power transmission lines" in the present disclosure. The power transmission line $3b$ is an example of the "one or more second power transmission lines" in the present disclosure.

The controller 10A-1 controls the power transmitters 20-1-1 and 20-1-2 and the power receivers 40-1-1, 40-1-2, and 40-1-3.

As illustrated in FIG. 18, the controller 10A-1 acquires information on power for maximizing the transmission efficiency in the power transmission line $3a$ (i.e., the optimum power Peffmax_a) and acquires information on power for maximizing the transmission efficiency in the power transmission line $3b$ (i.e., the optimum power Peffmax_b). The controller 10A-1 determines the optimum power Peffmax in the power transmission lines $3a$ and $3b$ based on the information on the optimum power Peffmax_a and the optimum power Peffmax_b. In this case, for example, the transmission power in the power transmission line $3a$ is set to a value of the optimum power Peffmax_a. The transmission power in the power transmission line $3b$ is set to a value of the optimum power Peffmax_b.

The power transmission system according to the present disclosure is useful for transmitting power from generators such as a solar power generator, a wind power generator, and a water power generator to a railroad, an EV vehicle, and the like.

What is claimed is:

1. A system comprising:
    one or more power transmitters, each of which includes a modulator and is connected to a power supply;
    a plurality of power receivers, each of which includes a demodulator and is connected to a corresponding one of a plurality of loads;
    one or more power transmission lines, through which the one or more power transmitters are connected with the plurality of power receivers; and
    a controller that:
        (A) acquires information on optimum power for maximizing transmission efficiency in the one or more power transmission lines, and information on a plurality of power demands respectively requested by the plurality of loads,
        (B) routes, based on the information on the optimum power, transmission power from the one or more power transmitters to at least one selected from the plurality of power receivers, the transmission power being equal to or smaller than the optimum power,
        (C) when a total of the plurality of power demands is larger than the optimum power, requests that another controller controls supplementary power to be supplied from another power supply to the one or more power transmission lines, and
        (D) when the total of the plurality of power demands is smaller than the optimum power, notifies the other controller that surplus power of the one or more power transmitters is available,
    wherein the modulator determines whether or not to reverse a direction of a current of at least part of power from the power supply according to whether each bit of a modulation code sequence is a first value or a second value; and
    the demodulator, which is included in the selected at least one of the plurality of power receivers, determines whether or not to reverse a direction of a current of at least part of the routed transmission power according to whether each bit of a demodulation code sequence is the first value or the second value.

2. The power transmission system according to claim 1, wherein
    the one or more power transmitters include a plurality of modulators, one of which is the modulator, and
    the controller, in (B),
        determines one or more modulation code sequences, one of which is the modulation code sequence, and
        determines one or more demodulation code sequences, one of which is the demodulation code sequence, the one or mode demodulation code sequences respectively corresponding to the one or more modulation code sequences,
        sends the one or more modulation code sequences respectively to one or more of the plurality of modulators, and
        sends the one or more demodulation code sequences respectively to one or more of the plurality of power receivers.

3. The power transmission system according to claim 1, wherein each of the modulation code sequence and the demodulation code sequence includes one or more orthogonal code sequences.

4. The power transmission system according to claim 1, wherein the controller further:
    (D) acquires information on a maximum of power transmittable via the one or more power transmission lines and controls power to be inputted to the one or more power transmission lines such that the power to be inputted is equal to or smaller than the maximum.

5. The power transmission system according to claim 1, wherein
    the one or more power transmitters include a first power transmitter and a second power transmitter,
    the one or more power transmission lines include one or more power transmission lines through which the first power transmitter is connected with the plurality of power receivers, and one or more second power transmission lines through which the second power transmitter is connected with the plurality of power receivers, and
    the controller, in (A),
        acquires information on first optimum power for maximizing first transmission efficiency in the one or more first power transmission lines,
        acquires information on second optimum power for maximizing second transmission efficiency in the one or more second power transmission lines, and
        determines the optimum power based on the information on the first optimum power and the second optimum power.

6. The power transmission system according to claim 1, wherein the power supply is a direct-current power supply or an alternating-current power supply.

7. The power transmitting system according to claim 1, wherein:
    the modulator includes:
        a first bridge circuit including a plurality of first switches, and
        a first control circuit which generates, based on the modulation code sequence, a plurality of first control signals for turning on and off the plurality of first switches,
    the demodulator includes:
        a second bridge circuit including a plurality of second switches, and a second control circuit which generates, based on the demodulation code sequence, a plurality of second control signals for turning on and off the plurality of second switches.

8. The power transmitting system according to claim 7, wherein each of the plurality of first switches and the plurality of second switches is a bidirectional switch.

9. A power transmission system comprising:
one or more power transmitters, each of which includes a modulator and is connected to a power supply;
a plurality of power receivers, each of which includes a demodulator and is connected to a corresponding one of a plurality of loads;
one or more power transmission lines, through which the one or more power transmitters are connected with the plurality of power receivers; and
a controller that:
(A) acquires information on optimum power for maximizing transmission efficiency in the one or more power transmission lines, and information on a plurality of power demands respectively requested by the plurality of loads,
(B) routes, based on the information on the optimum power, transmission power from the one or more power transmitters to at least one selected from the plurality of power receivers, the transmission power being equal to or smaller than the optimum power,
(C) when a total of the plurality of power demands is larger than the optimum power, requests that another controller controls supplementary power to be supplied from another power supply to the one or more power transmission lines, and
(D) when the total of the plurality of power demands is smaller than the optimum power, notifies the other controller that surplus power of the one or more power transmitters is available,
wherein the controller, in (A),
acquires information on a plurality of correspondence relations, each between one or more paths selected from a plurality of paths on the one or more power transmission lines and the transmission efficiency with which a predetermined power is transmitted through the selected one or more paths, and
determines, based on the information on the plurality of correspondence relations, the predetermined power that maximizes the transmission efficiency as the optimum power.

\* \* \* \* \*